US009479388B2

(12) United States Patent
Castel et al.

(10) Patent No.: US 9,479,388 B2
(45) Date of Patent: Oct. 25, 2016

(54) COMPUTER SYSTEM AND METHOD FOR MAINTENANCE MANAGEMENT INCLUDING COLLABORATION ACROSS CLIENTS

(71) Applicant: MAINTENANCE ASSISTANT INC., Toronto (CA)

(72) Inventors: Marc F. Castel, Orangeville (CA); Corbin Church, Westmount (CA)

(73) Assignee: MAINTENANCE ASSISTANT INC, Toronto ON (CA)

( * ) Notice: Subject to any disclaimer, the term of this patent is extended or adjusted under 35 U.S.C. 154(b) by 471 days.

(21) Appl. No.: 14/013,817

(22) Filed: Aug. 29, 2013

(65) Prior Publication Data
US 2014/0164603 A1 Jun. 12, 2014

Related U.S. Application Data
(60) Provisional application No. 61/694,535, filed on Aug. 29, 2012.

(51) Int. Cl.
*G06F 15/16* (2006.01)
*H04L 12/24* (2006.01)
(Continued)

(52) U.S. Cl.
CPC ......... *H04L 41/04* (2013.01); *G06Q 10/06311* (2013.01); *H04L 43/0876* (2013.01)

(58) Field of Classification Search
CPC ... H04L 41/04; H04L 43/0876; H04L 12/24; H04L 12/26; G06Q 10/06311
See application file for complete search history.

(56) References Cited

U.S. PATENT DOCUMENTS

| | | | | |
|---|---|---|---|---|
| 8,214,494 B1 * | 7/2012 | Slavin | .................... | G08B 25/08 709/203 |
| 8,630,193 B2 * | 1/2014 | Bugenhagen | ........... | H04L 41/14 370/252 |

(Continued)

FOREIGN PATENT DOCUMENTS

| | | |
|---|---|---|
| CA | 2393395 A1 | 6/2001 |
| CA | 2384887 A1 | 9/2001 |

(Continued)

OTHER PUBLICATIONS

Christa Thoma, "Modern Software Solutions", International Cement Review, Feb. 2010, retrieved from http://www.mespas.com/multimedia/docs/Media/International_Cement_Review_Modern_Software_Solution_mespas_R5.pdf.

(Continued)

*Primary Examiner* — Arvin Eskandarnia
(74) *Attorney, Agent, or Firm* — Norton Rose Fulbright Canada LLP; Niall Cooney

(57) ABSTRACT

A computer system is provided that is connected to the Internet and enables a plurality of network connected devices to access a novel and innovative resource management platform. The computer system includes an Internet enabled computer platform that implements a multi-tenant architecture that enables multiple platform clients to populate the platform with various information regarding their resource management requirements. The computer system includes one or more tools that (i) track activities of users in connection with the management of resources, (ii) extracts insights from such activities, and/or (iii) enables users to upload information or documents related to resource management to the computer system, such tools enabling the automated suggestion of maintenance actions and/or product or service requirements of platform clients. A range of different intelligent features are provided. The computer system may include a CMMS with intelligent features. A number of related computer implemented methods for managing resources in an intelligent way, and based on collective information and knowledge is also provided.

20 Claims, 15 Drawing Sheets

(51) Int. Cl.
  *G06Q 10/06* (2012.01)
  *H04L 12/26* (2006.01)

(56) References Cited

U.S. PATENT DOCUMENTS

2003/0088528 A1* 5/2003 Parry ................ G03G 15/5075
                                                   706/1
2004/0068549 A1* 4/2004 Motoyama ........... H04L 43/067
                                                   709/208
2008/0215560 A1* 9/2008 Bell .................. G06F 17/30991
2008/0244337 A1* 10/2008 Breiter ............. G06Q 10/06311
                                                   714/699
2010/0315951 A1* 12/2010 Bugenhagen ........... H04L 41/14
                                                   370/241
2014/0129942 A1* 5/2014 Rathod ............ H04N 21/44222
                                                   715/720

FOREIGN PATENT DOCUMENTS

| CA | 2384443 | A1 | 12/2001 |
| CA | 2690459 | A1 | 12/2008 |
| CA | 2694874 | A1 | 2/2009 |
| CA | 2782023 | A1 | 6/2011 |
| CA | 2756198 | A1 | 4/2012 |
| CN | 103093301 | A | 5/2013 |

OTHER PUBLICATIONS

World Intellectual Property Office, International Search Report dated Nov. 7, 2013, issued in corresponding International Patent Application No. PCT/CA2013/000745.

* cited by examiner

FIG. 4A

| | Type | Code | Estimated Hrs | Description | Site | Actual Hrs | Assigned User |
|---|---|---|---|---|---|---|---|
| ☐ | | 3106 | 900.00 | Filters need to be changed out. | (No Site) | 0.00 | |
| ☐ | Work Orders | 3095 | 1.00 | Comprar pan | (No Site) | 1.00 | Kevin Durant |
| ☐ | Preventive | 3075 | 0.00 | Squeaky front Brakes | (No Site) | 0.00 | Guest |
| ☐ | Project | 3046 | 2.00 | 3 lights out in sanctuary. 300 watt bulbs. | (No Site) | 3.00 | Technicians |

| | Subject | Date Created | Sender | P... | Contents | Message... | Tenant | Opened |
|---|---|---|---|---|---|---|---|---|
| ☐ | Work Request Submitted | Aug 04, 2013 11:47:50 AM | MA CMMS | ☐ | Hi Gregg Jo... | 1 | 2,900 | ☑ |
| ☐ | Inventory depleted for as... | Aug 03, 2013 7:39:24 PM | MA CMMS | ☐ | Hi Logistics... | 1 | 2,900 | ☑ |
| ☐ | Asset "Volvo Truck1" is n... | Aug 03, 2013 5:26:52 PM | MA CMMS | ☐ | Hi Gregg Jo... | 1 | 2,900 | ☑ |
| ☐ | Work Request Submitted | Aug 02, 2013 6:38:09 PM | MA CMMS | ☐ | Hi Gregg Jo... | 1 | 2,900 | ☑ |
| ☐ | Work order was assigned... | Aug 02, 2013 6:36:56 PM | MA CMMS | ☐ | Hi Technicia... | 1 | 2,900 | ☑ |
| ☐ | Work order was assigned... | Aug 02, 2013 6:36:56 PM | MA CMMS | ☐ | Hi Technicia... | 1 | 2,900 | ☑ |
| ☐ | Inventory depleted to... | Aug 01, 2013 02:00:42 PM | MA CMMS | ☐ | Hi Logistics... | 1 | 2,900 | ☑ |
| ☐ | Work order was assigned... | Jul 31, 2013 5:02:09 PM | MA CMMS | ☐ | Hi Technicia... | 1 | 2,900 | ☑ |
| ☐ | Inventory depleted for as... | Jul 31, 2013 12:23:59 PM | MA CMMS | ☐ | Hi Logistics... | 1 | 2,900 | ☑ |
| ☐ | Work order "3075" has be... | Jul 31, 2013 10:03:28 AM | MA CMMS | ☐ | Hi Gregg Jo... | 1 | 2,900 | ☑ |
| ☐ | Work Request Submitted | Jul 30, 2013 09:13:40 PM | MA CMMS | ☐ | Hi Gregg Jo... | 1 | 2,900 | ☑ |
| ☐ | Work order was assig... | Jul 30, 2013 11:38:37 AM | MA CMMS | ☐ | Hi Gregg Jo... | 1 | 2,900 | ☑ |
| ☐ | Work Request Submitted | Jul 30, 2013 09:23:33 AM | MA CMMS | ☐ | Hi Gregg Jo... | 1 | 2,900 | ☑ |
| ☐ | Work order was assigned... | Jul 01, 2013 02:54:35 PM | MA CMMS | ☐ | Hi Technicia... | 1 | 2,900 | ☑ |
| ☐ | Work Request Submitted | Jul 01, 2013 02:51:51 PM | MA CMMS | ☐ | Hi Gregg Jo... | 1 | 2,900 | ☑ |
| ☐ | Work Request Submitted | Jun 29, 2013 02:06:45 AM | MA CMMS | ☐ | Hi Gregg Jo... | 1 | 2,900 | ☑ |
| ☐ | Work order was assigned... | Jun 28, 2013 10:40:56 AM | MA CMMS | ☐ | Hi Gregg Jo... | 1 | 2,900 | ☑ |
| ☐ | Work Request Submitted | Jun 27, 2013 06:52:25 AM | MA CMMS | ☐ | Hi Technicia... | 1 | 2,900 | ☑ |
| ☐ | Work Request Submitted | Jun 27, 2013 03:29:11 AM | MA CMMS | ☐ | Hi Gregg Jo... | 1 | 2,900 | ☑ |
| ☐ | Work Request Submitted | Jun 27, 2013 01:21:09 AM | MA CMMS | ☐ | Hi Gregg Jo... | 1 | 2,900 | ☑ |

| | MA CMMS | Account | | Show Video Help | | |
|---|---|---|---|---|---|---|
| Acme Business *Gregg Johnson* | | | | | | |
| ⊙ Dashboard | | Reports | | | 🔍 ⋮⋮⋮ | |
| ✱ Maintenance | | ☐ | Name | | Description | |
| ○ Notifications | | ☐ | # Completed Work Order Per Month | | This report details graphically the number of c | |
| 🖐 Assets | | ☐ | # Completed Work Order Per Month by Asset | | This report details graphically the number of c | |
| ⊡ Supplies | | ☐ | # Completed Work Order Per Month by Asset Category | | This report details graphically the number of c | |
| ⊡ Reports | | ☐ | # Completed Work Order Per Month by User | | This report details graphically the number of c | |
| ( All Assets ) | | ☐ | # Work Orders Assigned V Completed by User | | Shows the number of work orders assigned in | |
| ⚙ Settings | | ☐ | # Work Orders Requested V Completed | | Shows the number of work orders assigned in | |
| | | ☐ | # Work Orders Requested V Completed by Asset | | Shows the number of work orders assigned in | |
| | | ☐ | # Work Orders Requested V Completed by Asset Category | | Shows the number of work orders assigned in | |
| | | ☐ | # Work Orders Requested V Completed by Asset Category | | Shows the number of work orders assigned in | |
| | | ☐ | All Assets List Excep Dump | | This report details all Assets on the system and | |
| | | ☐ | All Work Orders by Status | | Display all work orders and their tasks by a pre | |
| | | ☐ | Asset List by Location (Equipment Only) | | This report details all Equipment Assets in a pa | |
| | | ☐ | Asset Meter Reading History | | Display a pre specified assets meter reading hi | |
| | | ☐ | Asset Meter Reading History Over a Specific Period | | Display a pre specified assets meter reading hi | |
| | | ☐ | Asset Meter Reading Summary (Between Dates) | | Lists the first and last meter readings taken bet | |
| | | ☐ | Asset Meter Reading Work Sheet | | Lists the last meter reading of each unit for ass | |
| | | ☐ | Asset Meter Reading Work Sheet by Asset Category | | Lists the last meter reading of each unit for ass | |
| | | ☐ | Asset Warranty Tracker | | List all Assets whose warranties have expired | |
| | | ☐ | Cervalis Upcoming Schedule Maintenance | | This report lists the upcoming scheduled maint | |
| | | ☐ | Chart Work Orders Suggested Vs. Actual Completion Date | | Details graphically whether W/O's are being co | |
| | | ☐ | Chart Work Orders Suggested Vs. Actual Completion Date by Category | | Details graphically whether W/O's are being co | |

FIG.4H

| | | | | | | |
|---|---|---|---|---|---|---|
| MA CMMS | Account | | Save | Import | Print | |
| Acme Business Gregg Johnson | | Asset Categories | Maintenance And Work Order | RFQ's | Custom Fields | Work Requests | Lookup Tables |

| | |
|---|---|
| Dashboard | Audit Log |
| Maintenance | |
| Notifications | Asset Categories |
| Assets | |
| Supplies | |
| Reports | |
| Settings | |
| Cmms Settings | |
| Business | |
| Users | |
| User Groups | |
| Notification Templates | |
| Import | |

| Display Name | Assets |
|---|---|
| Assets | 0 |
| Customers and Locations | 15 |
| Buildings | 1 |
| Plants | 0 |
| Production line | 2 |
| Well Sites | 0 |
| Equipment | 15 |
| Etch | 2 |
| Fusion | 1 |
| Machining | 3 |
| Management | 0 |
| Printing Press Sheetfed | 0 |
| Pump | 0 |
| Steam Locomotive | 0 |
| Trailers | 1 |
| Trucks | 26 |
| Parts & Supplies | 2 |
| Batteries | 0 |
| Conveyor Parts | |

COMPUTER SYSTEM AND METHOD FOR MAINTENANCE MANAGEMENT INCLUDING COLLABORATION ACROSS CLIENTS

CROSS REFERENCE TO RELATED APPLICATIONS

This application claims all benefit, including priority, of each of U.S. Provisional Patent Application Ser. No. 61/694,535, filed on Aug. 29, 2012, entitled SYSTEM AND METHOD FOR ENABLING A MAINTENANCE RELATED COMMUNITY BASED ON SOCIAL MEDIA INTERACTIONS, the entire contents of which are incorporated herein by this reference.

FIELD OF INVENTION

The present invention relates to maintenance management systems.

BACKGROUND OF INVENTION

Every business must manage the various resources that are critical to their business operations. Large enterprises often make significant investments in implementation of platforms and development of business processes related to resource management. These investments are outside the reach of many small to medium enterprise (SMEs) that constitute ninety-nine percent (99%) of enterprises.

A good example of this is the maintenance of equipment. Maintenance is a critical aspect of any business, in any industry, yet in many cases there is little focus on maintenance until there has been a breakdown. Maintenance related downtime can be very costly to a business, sometimes resulting in significant losses every hour that a key machine is down.

Maintenance departments typically rely on unreliable paper-based information systems that often produce inaccurate, outdated, confusing, or non-existent data, which can be lost or destroyed easily. Moreover, it is often challenging to align and manage a maintenance department's priorities (such as maintaining a machine) with a production department's priorities (such as manufacturing goods).

Various computerized maintenance management systems (CMMS's) are known. These systems are designed to digitize data and manage a maintenance department's activities such as work orders, scheduling, reporting, inventory, and personnel. However, the proper use of a CMMS is generally fraught with difficulty due to the complex nature of most CMMS's, their significant cost, and non-intuitive or confusing workflows, which taken together, do not lead to improved efficiencies or productivities of a maintenance department, or to a company's bottom line.

Many prior CMMS's: (a) are difficult to setup, maintain and use, (b) do not facilitate access to required information, and (c) do not enable key functions that are desired by customers such as parts procurement.

The problems identified above lead to lost productivity, increased downtime, reduced efficiencies and low competitiveness.

There is a need for a resource management platform and also more particularly a maintenance management platform that addresses one or more of the mentioned problems.

SUMMARY OF INVENTION

In one aspect of the invention, a computer system is provided that is connected to the Internet and enables a plurality of network connected devices to access a novel and innovative resource management platform. The computer system may be implemented as an Internet enabled computer platform that implements a multi-tenant architecture that enables multiple platform clients to populate the platform with various information regarding their resource management requirements.

In one implementation the computer system includes one or more tools that (i) track activities of users in connection with the management of resources, (ii) extracts insights from such activities, and/or (iii) enables users to upload information or documents related to resource management to the computer system. The computer system includes a series of intelligent features that use (i), (ii) and/or (iii) to suggest automatically maintenance actions and/or product or service requirements to users.

In one implementation of the invention, the computer system provides a CMMS, and users configure a list of machines or other products that require maintenance. The CMMS is configured to include one or more intelligent features that streamline the process of setting up a platform client's maintenance requirements on the CMMS, and automate one or more maintenance related actions.

In one aspect of the invention, a cloud based CMMS is provided that enables management or maintenance of various enterprise assets (such as for example equipment) including for example:

(A) Logging of various assets requiring maintenance ("assets");

(B) Generation and tracking of maintenance schedules. This may include tracking various maintenance "activities" associated with an asset (for example performing a particular diagnostic operation, or maintenance operation). Activities may be "required" or "recommended". The platform may be configured to generate reminders and/or calendar entries based on activities. The platform may enable an administrator to assign activities to particular personnel and also send reminders to their mobile phone for example based on user defined parameters.

(C) Executing activities, including on an automated basis. This may include checking an inventory system to see if a part required for an activity is available, or ordering a part automatically from a supplier. As part of the execution related features, the CMMS may also include supply chain management tools (including order processing and delivery management).

In another aspect of the present invention, the CMMS is configured to implement a preventative approach to maintenance of assets.

In another aspect, a system for managing maintenance of resources such as equipment or devices, is provided comprising: (A) a plurality of computer terminals linked to a computer network, each computer terminal associated with an individual; and (B) one or more computers executing a computerized maintenance management system (CMMS) as a computer network service made available to users of a plurality of clients using the computer terminals; wherein the CMMS (i) tracks activities of users (across at least two clients) in connection with the management of resources, (ii) extracts insights from such activities, and optionally (iii) enables users to upload information or documents related to resource management to the system, and extracts from such information or documents an information set; and wherein the CMMS analyses the information set and generates automatically one or more suggested maintenance actions and/or product or service requirements for clients ("suggestions"), and communicates the suggestions to one or more clients for whom it is determined that the suggestions are relevant.

In another aspect, the CMMS monitors the performance of a set of resources associated with varying maintenance actions, and extracts best practice information based on the resources that perform the best, and uses these best practices to generate suggestions.

In another aspect, the CMMS includes one or more data filters for filtering confidential information, sensitive information, or information that a client elects not to share, from suggestions.

In another aspect, the system comprises a social networking platform that enables clients to selectively share maintenance related information. In yet another aspect, the social networking platform enables clients to aggregate product or service requirements in order to share costs.

In a still other aspect, the social networking platform enables clients to permit their inventory information to be accessible, or accessible in part, by one or more other clients selected by them (networked clients), in order to share inventory, including parts inventory.

In another aspect, the CMMS allows clients to search for required parts from networked clients based on part parameters and geographic parameters. In yet another aspect, the CMMS automatically detects gaps in a first client's inventory based on its resources, and automatically suggests inventory available from its networked clients.

In another aspect, the CMMS comprises: (A) the computer network service; and (B) a local computer system component that connects to the computer network service; wherein the local computer system includes an export utility that permits a client to selectively determine the information to be exported to the computer network service for storage to a data store for use in routines using information across a plurality of clients.

In yet another aspect, the CMMS includes or connects to a semantic analyzer for determining that two or more information sets relate to a similar resource or to the same resource.

In another aspect, the suggestions include: a maintenance action; or purchase of particular new piece of equipment, or part.

In another aspect, a method is provided for managing maintenance of resources such as equipment or devices, the method comprising: linking a plurality of computer terminals to a computer network, each computer terminal associated with an individual, and linking one or more of the computer terminals to one or more computers executing a computerized maintenance management system (CMMS), implemented as a computer network service made available to users of a plurality of clients using the computer terminals; two or more clients ("participating clients") permitting the CMMS to (i) track activities of users across the participating clients in connection with the management of resources, (ii) extract insights from such activities, and optionally (iii) enabling users to upload information or documents related to resource management to the computer system, thereby extracting an information set; the CMMS executing an analytics and suggestion routine, the analytics and suggestion routine analyzing the information set and generating automatically one or more suggested maintenance actions and/or product or service requirements for clients ("suggestions"); and at least one client receiving suggestions at one or more computer terminals.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein:

FIGS. 4a, 4b, 4c, 4d, 4e, 4f, 4g, 4h and 4i show representative web pages presented by the computer server of the present invention;

Figure 1:
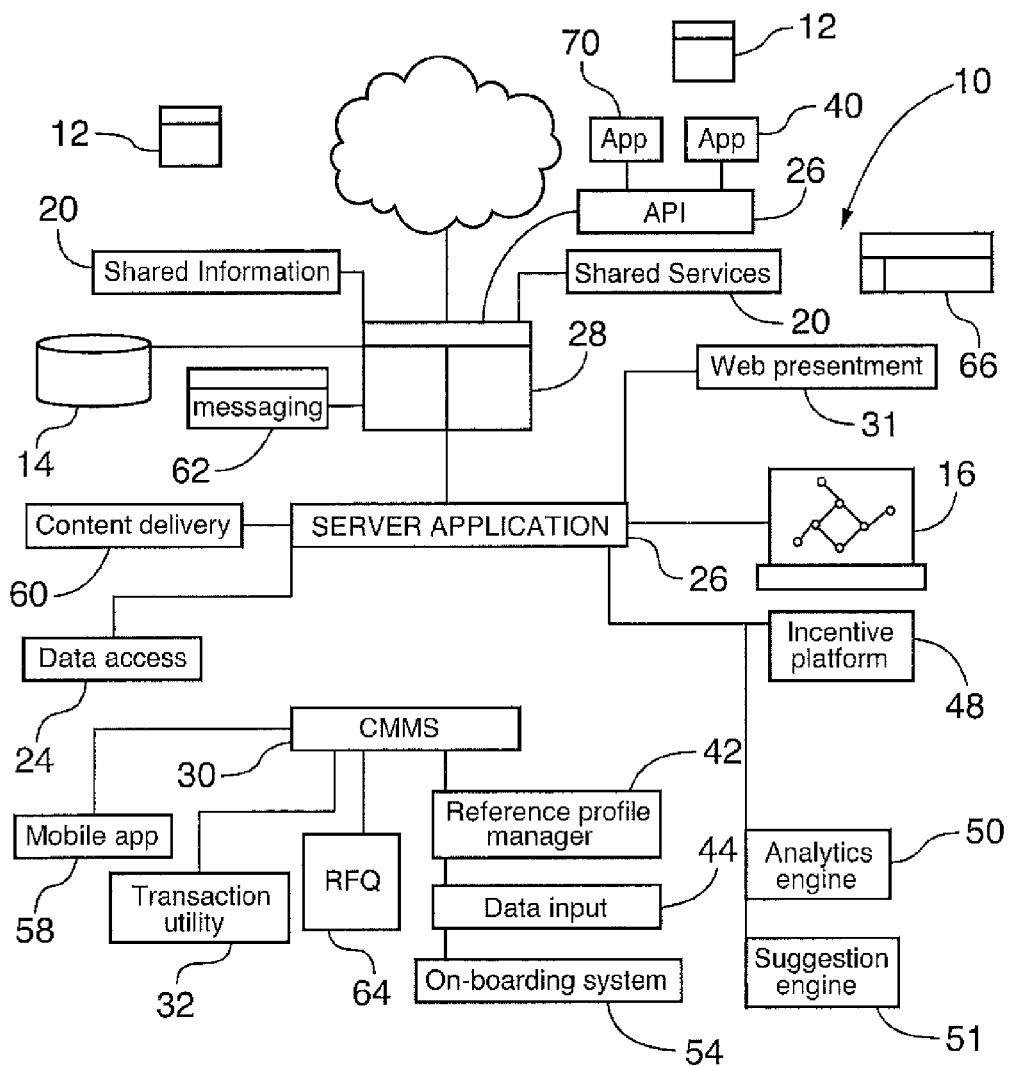
FIG. 1 is a system diagram of the system of the present invention, in one implementation thereof.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Definitions

In this disclosure, by "social networking platform" means any computer network implemented application platform that is operable to generate a series of web pages so as to define a series of user interactions and/or workflows, including social media interactions, that define a social networking environment.

"Friends" refers to two or more users of a social networking platform who share one or more social interaction privileges by operation of the social networking platform, based on one or more pre-established rules. Conferring the social interaction privileges may require user acceptance and/or may be assigned automatically by the social networking platform based on the rules.

"Social media interactions" refer to the various interactions between users of a social networking platform (including "friends"), the interactions including various communications (such as platform messaging, instant messaging, videoconferencing, voice messaging, etc.), uploading or posting content in one or more media, downloading content in one or more media, watching content in one or more media, reviewing or rating content including "objects", taking a quiz, selling or trading items such as "objects", and so on.

"Objects" include any content or media object that may be used or consumed in connection with social interactions, such as for example a social feed, a message, a use case, a video, quiz, a tip, a discussion, a digital good, etc.

Resource Management Platform with Integrated Social Features

As shown in FIG. 1, in one aspect of the invention a resource management platform (10) is provided. The platform (10) utilizes a multi-tenant architecture that enables multiple platform clients (12) to populate the platform (10) (for example a database (14) associated with the platform (10)) with various information regarding their resource management requirements. Significantly, the resource management platform (10) includes a social networking layer, which may be implemented using a social networking platform (16) for enabling platform clients (12) to co-operate through the platform (10) by sharing information and optionally resources, and aggregating requirements for products and services related to resource management, thereby lowering costs, as further explained below.

Typically, enterprise clients manage their resources as an internal matter and do not share information and resources with one another. Many enterprises use an enterprise resource planning platform or ERP system to manage the various products and services that they consume in operating their business. These systems often include features for product ordering and delivery, inventory management, transportation management, accounting, contract management and so on.

One of the insights of the inventors is that tremendous benefits can be realized by various entities, including businesses and government organizations (referred to as "enterprises" in this disclosure), if a mechanism can be found to motivate enterprises to share information and resources. One aspect of the invention is the discovery that this objective can be met by providing a resource management platform (10) that provides tools that are valuable to enterprises in their internal resource management activities, but that integrates social features that enable specific social media interactions that enable enterprises to co-operate for shared benefit. These benefits may include greater operational efficiency, more rapid access to important business inputs, lower costs associated with business inputs, and so on.

Prior to the present invention, no platform was disclosed or conceived that included a multi-tenant resource management solution, linked to a social networking platform configured to enabled co-operation between enterprises who may even be competitors.

In a further aspect of the invention, the inventors realized that conventional open social media interactions (open sharing of information and open communications within established networks) between platform clients who may be competitors would not be acceptable to many enterprises. In one aspect of the invention therefore, the operator of the platform (10) acts as a trusted intermediary in enabling information sharing and/or communications between platform clients in a particular way, so as to promote sharing of information and resources for shared benefit, while addressing the concerns of many participating enterprises in maintaining the confidentiality of information concerning their internal operations (such as their suppliers, business processes, age of their equipment and so on). In other words, the platform (10) is configured to (A) provide useful resources to enterprises in a multi-tenant environment that segregates access for a first set of enterprise information, (B) based on predetermined rules accepted by platform clients, aggregate a second set of enterprise information (which may be a sub-set of the first set of enterprise information), and store the second set of enterprise information to an information hub (20). The information hub (20) may be implemented as a section of the database (14) that is tagged so as to be available to one or more shared services (22) that are made accessible to platform clients.

In one aspect of the invention, the platform (10) includes a data access utility (24). In one implementation, the data access utility (24) is used to manage access to various resources of the platform (10) for example by associating an access profile with usernames/passwords associated with a particular platform client. In one aspect of the implementation of the invention, the data access utility (24) may be used to configure the shared services (22) made available by the platform (10) on a platform client by platform client basis. In one aspect of the invention, the platform (10) is configured to define, through the use of the data access utility (24), a set of rules for establishing the eligibility of a particular platform client (12) to particular shared services (22). For example, platform clients may be required to provide access to information, or agree to share available resources, through the platform (10) with other platform clients in order to access certain shared services (22). This mechanism may be used to motivate platform clients (12) to share information and resources to a greater and greater extent. Conversely, platform clients may retain a certain amount of control over the information/resources that they agree to share through the platform (10). The inventors have discovered that this is an important feature in driving adoption and usage of the platform (10) in that enterprises may be attracted to the platform (10) but generally wish to first share information/resources in a selected domain, and thereafter if the experience has been positive (for example the benefits are seen to outweigh the perceived risks of engaging with other enterprises through the platform), then generally the platform clients (12) expand their engagement with the platform, which across multiple platform clients is in the interest of the platform clients and also the operator of the platform (10).

Also, as shown in FIG. 1, the platform (10) may be implemented as a cloud network implemented computer system. The platform (10) may be implemented by a server application (26) or application repository, linked to a server (28) or server farm.

In one aspect of the invention, the resource management platform (10) includes a computer network enabled computerized maintenance management software (CMMS) platform (30). A skilled reader will appreciate the invention may include resource management solutions or platforms other than a CMMS. However, the inventors have discovered that maintenance management is a ubiquitous aspect of enterprise operations, and furthermore one that many incumbent technology suppliers have not addressed in a manner that is satisfactory to many enterprises.

The CMMS (30) includes or is linked to a web presentment utility (31) that is configured to define a platform client assigned web area. This web area may be configured a platform client administrator for example to provide information concerning the platform client (such as account information to enable transactions), shared service selections, information display preferences and so on.

In one aspect of the invention, the inventors have developed a cloud based CMMS (30) that enables management or maintenance of various enterprise assets (such as for example equipment) including for example:

(A) Logging of various assets requiring assets ("assets");
(B) Generation and tracking of maintenance schedules. This may include tracking various maintenance "activities" associated with an asset (for example performing a particular diagnostic operation, or maintenance operation). Activities may be "required" or "recommended". The platform (10) may be configured to generate reminders and/or calendar entries based on activities. The platform (10) may enable an administrator to assign activities to particular personnel and also send reminders to their mobile phone for example based on user defined parameters.

(C) Executing activities, including on an automated basis. This may include checking an inventory system to see if a part required for an activity is available, or ordering a part automatically from a supplier. As part of the execution related features, the CMMS (30) may also include supply chain management tools (including order processing and delivery management).

In one aspect of the present invention, the CMMS (30) is configured to implement a preventative approach to maintenance of assets. A skilled reader will know that it has been shown that a proactive approach to asset maintenance, based on early detection of problems and timely maintenance, promotes asset health and longevity. It is important to note that one particular contribution of the invention is the discovery that the integration of the social features described above enables the development of far more effective preventative asset maintenance, by leveraging the collective asset maintenance related know-how of platform clients, as further explained below.

In a further aspect of the invention, the CMMS (30) is also linked to a transaction utility (32), for enabling platform clients (12) to order products/services related to their maintenance requirements directly through the platform (10). This provides convenience to the platform clients (12), and also enables the operator of the platform (10) to deliver certain value-added services to platform clients (12), as mentioned below, that require access to the transaction information.

In another aspect of the present invention, the platform (10) includes a service delivery platform (34) which is best understood as a series of utilities that enable the platform (10) to provide value added services to the various platform clients (12), for shared benefit, leveraging the information made available across multiple platform clients (12).

Figure 2:
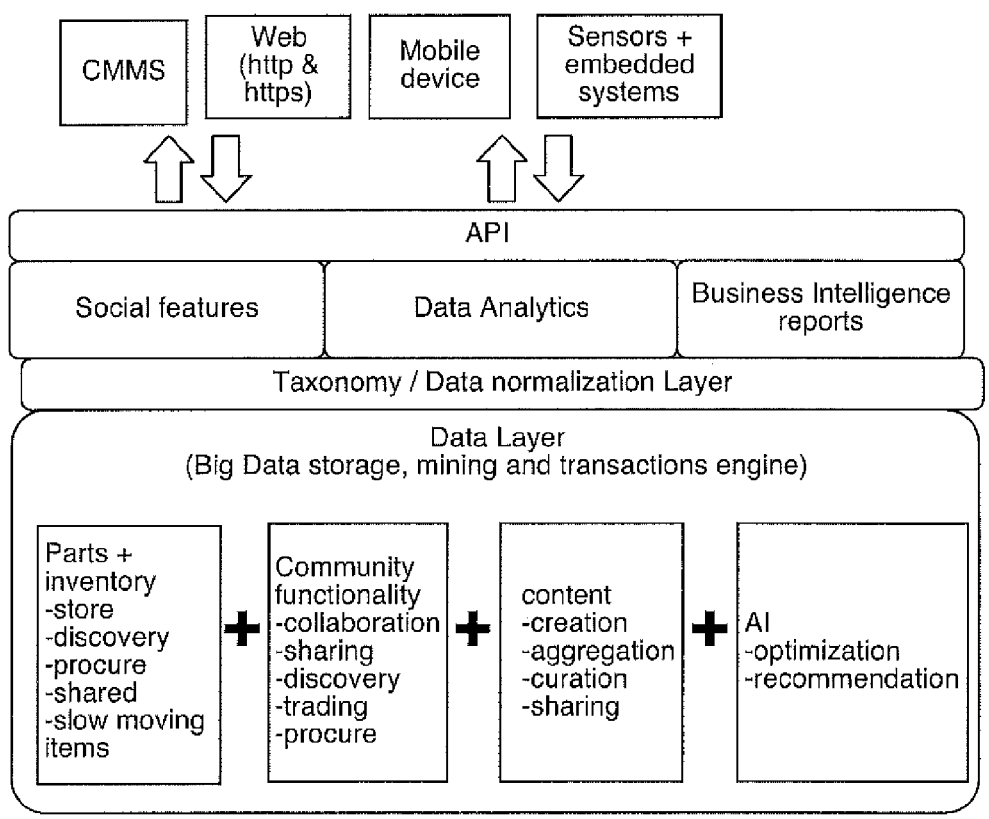
FIG. 2 is another system diagram illustrating the present invention, in another implementation thereof.

A skilled reader will appreciate that FIG. 1 illustrates a particular possible implementation of the platform (10). Many other implementations are possible. For example, FIG. 2, illustrates an alternate, web-based maintenance ecosystem that implements aspects of the platform (10) described in this disclosure. The platform (10) implementation as illustrated in FIG. 2, an API (33) that is configured to connect for example to a third party CMMS (40); various web based applications; sensors and embedded systems (35) that may connect directly to the platform (10) to provide access to maintenance related information; and also mobile devices. The API (33) is configured to make data available to a data layer, using a data normalization layer (37) that enables data to be stored in a manner that supports big data storage, data mining, and transactions. The data layer (39) enables the storage of information related to a number of functions including for example: parts & inventory; communication functionality; content creation; and analytics or artificial intelligence (including optimization and recommendation). The data layer (39) feeds a number of features that are made available to authorized network connected devices, for example social features (41), data analytics (43), and business intelligence reporting (45).

Figure 3:
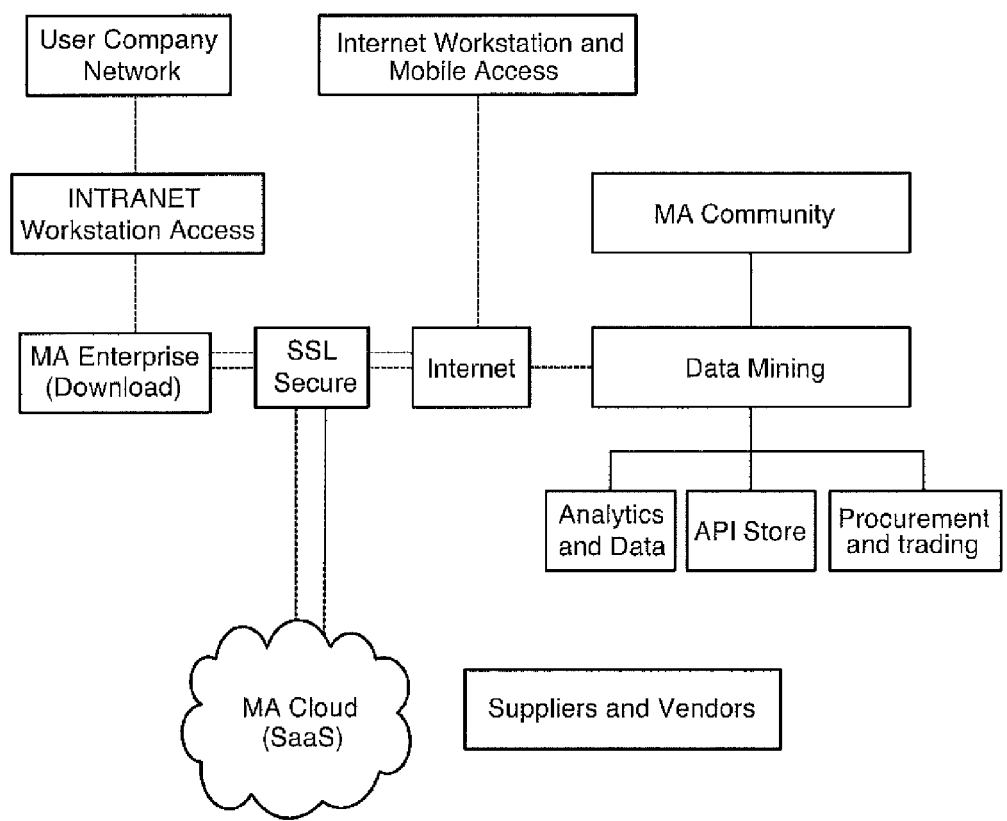
FIG. 3 is another system diagram illustrating a further implementation of the invention that includes enterprise server computer program installations that connect to the web-based platform of the present invention.

As shown in FIG. 3, in another aspect of the invention, in addition to implementation of the platform (10) as a SaaS based platform, the platform (10) may also include an enterprise system computer program (36), which may be implemented behind an enterprise firewall, and which maintains within the enterprise network environment the first set of enterprise information (referred to above). The enterprise system computer program (36) may also include an export utility (38) that is configured, based on one or more parameters accepted by the enterprise client, to gather and export to the server (28) the second set of enterprise information (also referred to above), which may be used to support the provision of shared services as described in this disclosure. Platform clients that do not wish to operate in a multi-tenant environment may implement the enterprise system computer program (36) and pay the associated licensing fees.

The platform (10) may also link to one or more third party CMMS systems (40). A skilled reader will appreciate that the server application (26) may be configured to link to third party CMMS systems (40) and extract the second set of enterprise information referred to in order to enable shared services (22) described below.

FIGS. 4a, 4b, 4c, 4d, 4e, 4f, 4g, 4h and 4i show representative interfaces that illustrate possible functions of the CMMS (30).

Figure 4A:
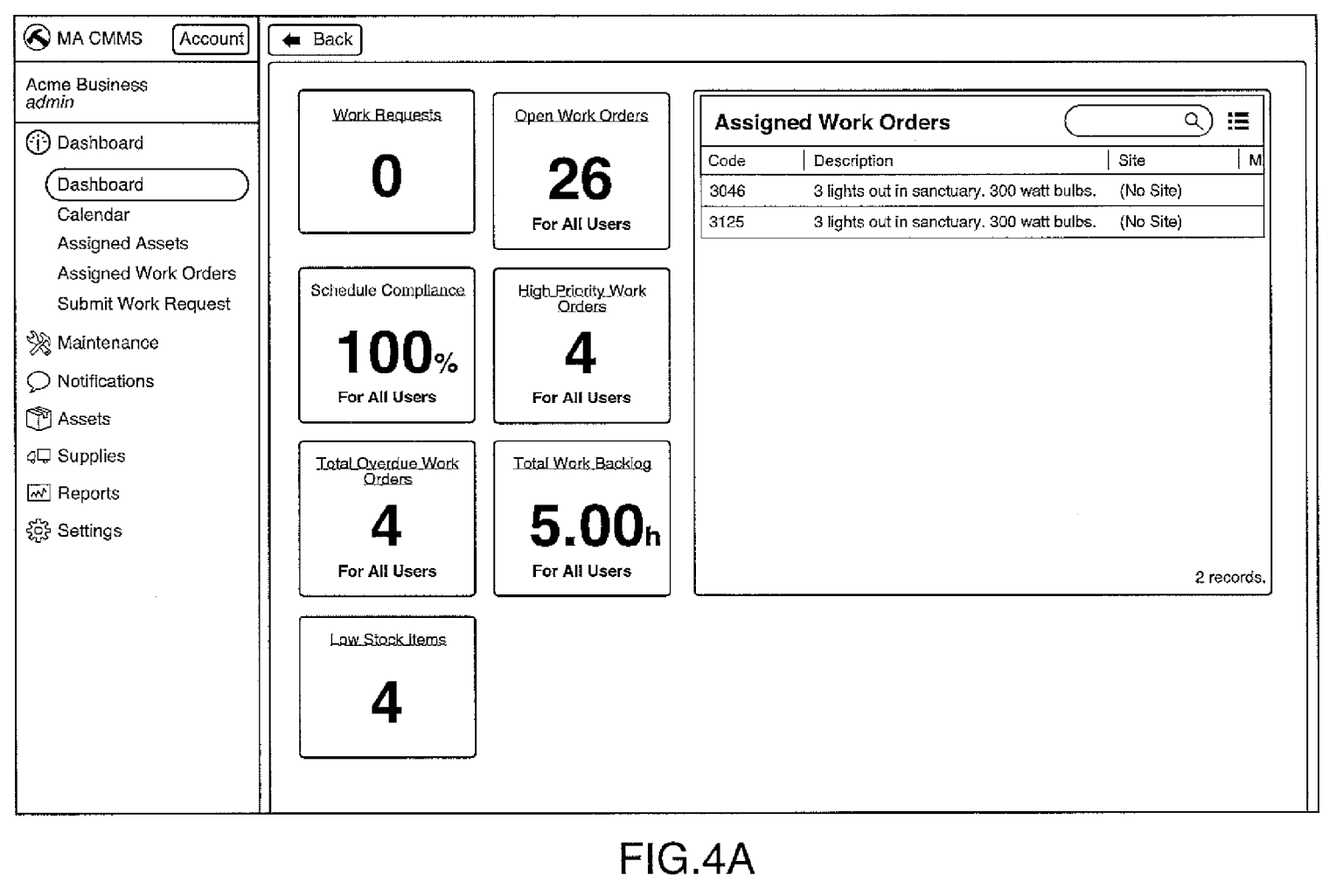

FIG. 4a illustrates a possible CMMS dashboard for accessing CMMS (30) features. In one aspect, the dashboard provides a unified view of a number of important items such as work requests; open work orders; schedule compliance; high priority work orders; overdue work orders; work backlog across users; and low stock items. Users may adjust their preferences regarding information displayed, and how it is displayed. Each object in the dashboard may be clickable to access additional information. The dashboard is designed to provide a unified view of maintenance related activities.

FIG. 4b illustrates a representative screen for showing additional details regarding work orders.

FIG. 4c illustrates a representative view of a notifications tool of the present invention. This tool provides an aggregate view of notifications across the a client's service provided by the CMMS (30), including for example submission of work requests, messages regarding such matters as inventory depletion and so on.

Figure 4D:

FIG. 4d shows a representative view of asset management functionality, which permits various inventories of assets to be seen in different views. The listed objects may be clickable items that enable users to access additional information.

Figure 4E:
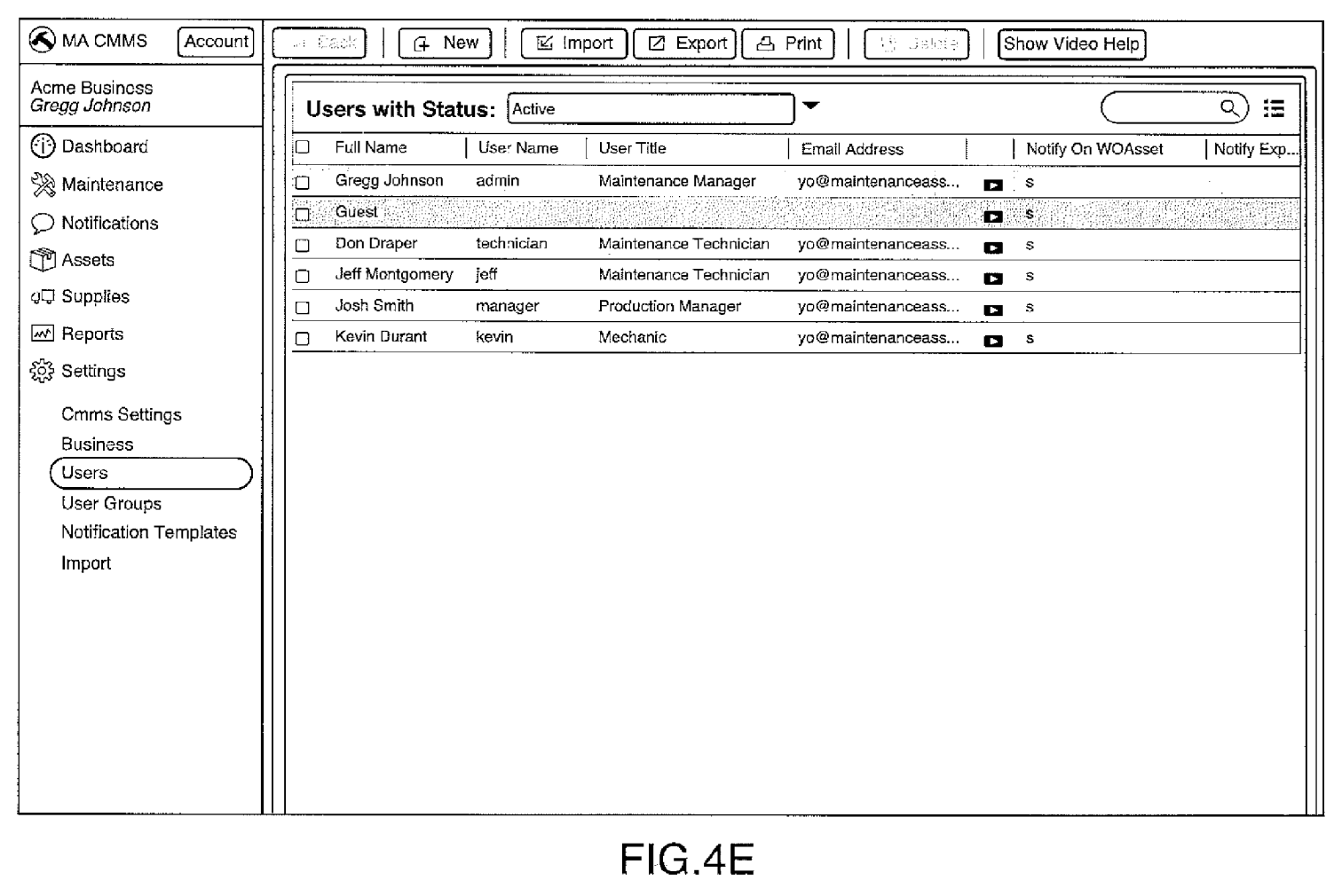

FIG. 4e shows a representative view of a user management functionality. Different users may be created on the system, and information may be provided such as their role, and reporting relationships may also be entered to the system. In one possible implementation, the CMMS (30) may be used to manage certification requirements. Certification details including expiry may be added through the user management features, and this may trigger reminders for example through workflows enabled by the CMMS (30).

Figure 4F:
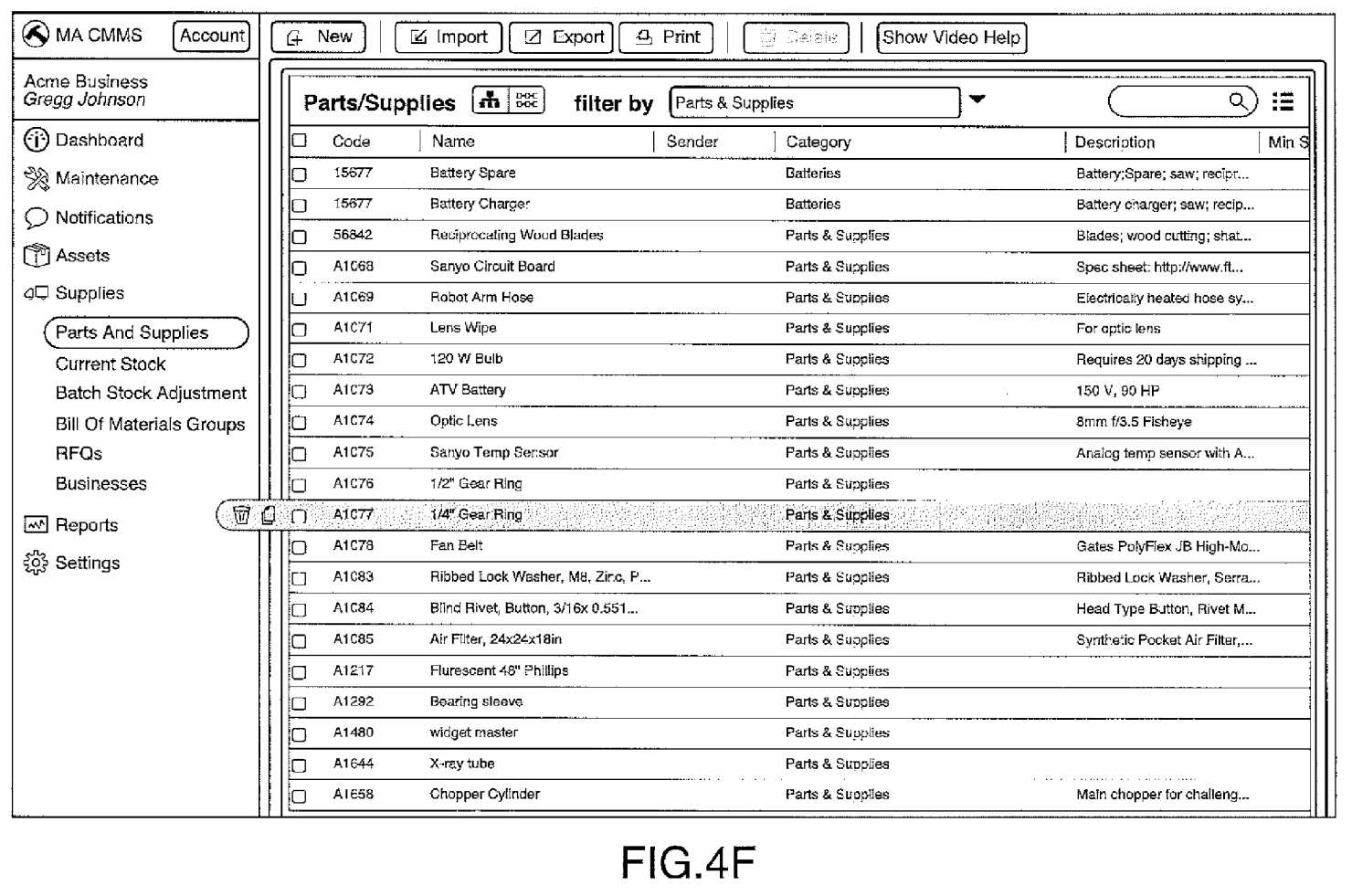
Figure 4G:
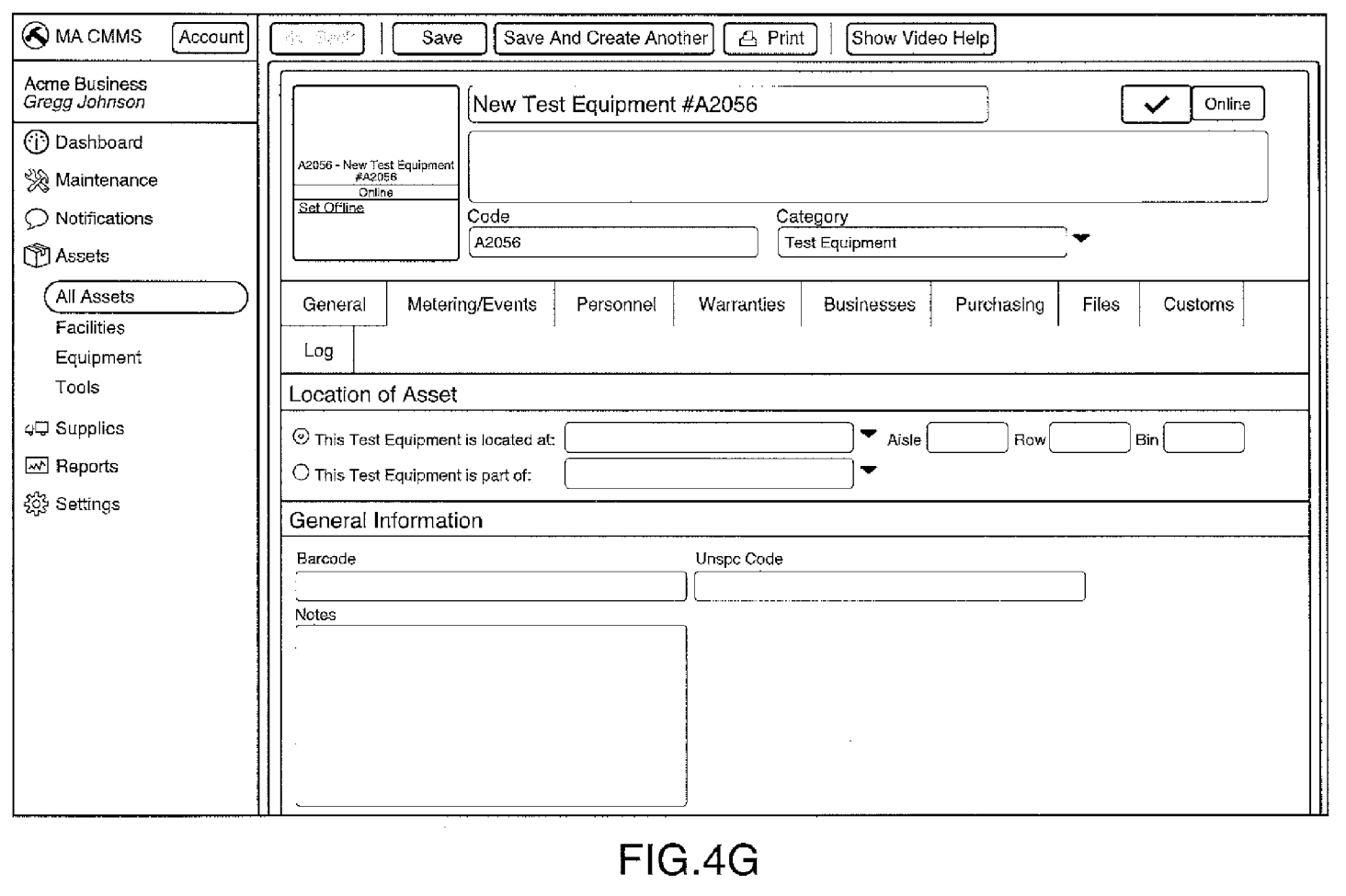

FIG. 4f illustrates a representative view of parts/supplies management features of the CMMS (30). Details regarding/parts supplied may be added. The CMMS (30) may link to or include an inventory management system. This permits access to inventory information (such as current stock) and allows inventory management workflows such as batch stock adjustment, bill of materials creation and so on. FIG. 4g illustrates a representative view for creating a new asset in the CMMS (3). Facilities, equipment and tools may be added in a similar manner.

FIG. 4h illustrates a representative view of reports features of the present invention. The CMMS (30) may generate, and allow users to access, a range of reports such all assets reports; work order requests compared to completed work orders by asset, by asset category, and so on; a warranty track report to access a snapshot of warranties for assets or asset categories; and so on.

FIG. 4i shows a representative view of setting features of the present invention, which allows a user to define various settings that they are authorized to access, based on the permissions defined for them.

In one aspect of the invention, the CMMS (30) includes functionality for managing work orders. FIG. 4b for example illustrates a list of work orders generated by the CMMS (30). In one aspect of the invention, the CMMS (30) may include advanced work order functionality. In one particular aspect of such advanced work order functionality, "multi-asset work order" capability is provided, which permits multiple assets and associated tasks to be added to a single work order without the need to create a work order hierarchy.

Multi-asset worker order capability is useful in completing "maintenance rounds" such as multi-asset inspections (or walk throughs) or maintenance in the field. Examples of applications include: multi-asset inspections of smoke detectors, exit signs, emergency lighting and fire extinguishers; data collection rounds; health and safety workplace inspections; environmental monitoring routes; washroom inspections or hotel room maintenance; regular facility security inspection routes; lubrication rounds; routine equipment start-up inspections; or machine and meter readings.

Multi-asset work orders facilitate completion of work in real-time by allowing users to complete work in the field and sign off on tasks on different tasks associated with different assets on the go. Handling such rounds using multi-asset work orders reduce administrative overhead by streamlining processes and reducing duplication of efforts. In addition, managers can obtain through the CMMS (30) and its use of multi-asset work orders greater visibility into the work that is being done. This visibility may be used for example to design inspection routes more efficiently, and also that enable better use of time of technicians or inspectors by ensuring that they proceed with assets/tasks in an efficient order. Additionally, multi-asset work orders reduce tracking assets and tasks to ensure that items are not missed.

In another aspect, more than one technician may be added to a specific task, and the CMMS (30) creates a task list user hierarchy for enabling the execution of the task by multiple technicians. One advantage of this functionality is enhanced ability to calculate automatically task related costs in that hourly and wage and their total hours are still recorded in a work log section of the CMMS (30), despite the fact that multiple users are completing a task. This can be especially useful for projects that require collaboration by multiple users on complex tasks.

Information Sharing

In one aspect of the CMMS (30), a resource profile manager (42) is provided. In one implementation, the resource profile manager (42) is best understood as one or more utilities that enable the management of profiles associated with various resources requiring maintenance that are associated with the platform (10).

A skilled reader will appreciate that each unique piece of equipment may have its own maintenance requirements. A unique piece of equipment is usually associated with information such as a product identifier, associated part numbers, equipment description, associated photographs, associated part information, and an associated maintenance schedules, associated user and technical manuals and so on ("equipment related information").

Figure 4J:
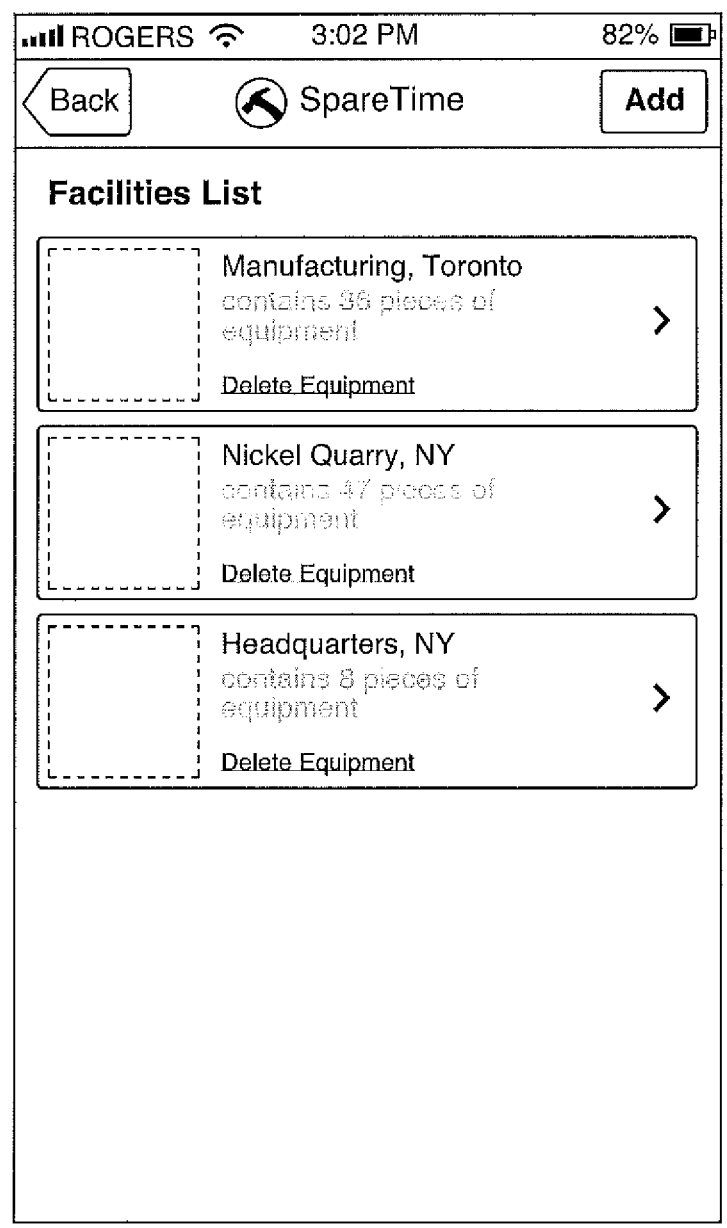
FIGS. 4j and 4k shows representative user interfaces presented by a mobile application that interoperates with the computer server of the present invention.
Figure 4K:
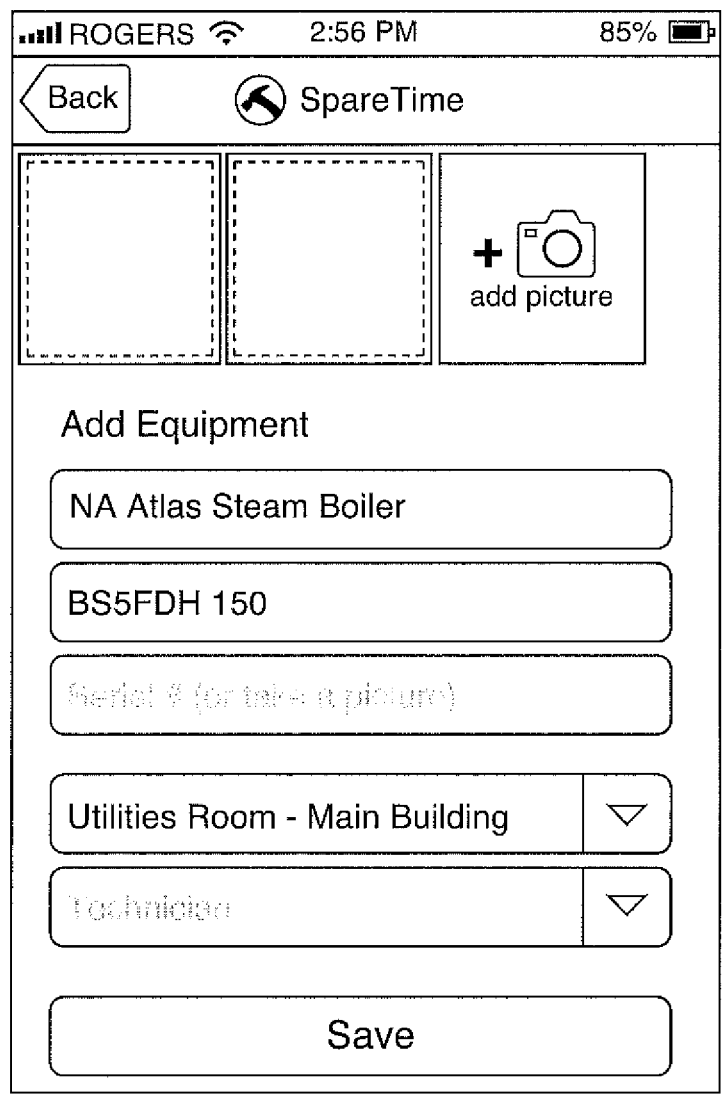

Some of this information is available from manufacturers, but it can be time consuming to try to organize this information in a way that it is readily accessible when it is needed. A skilled reader will appreciate that the staff responsible for maintenance often do not have access to administrative support with access to computers system such as document management systems. Moreover maintenance teams are usually under-resourced and do not have time to engage in administrative tasks such as storing equipment related information electronically in an organized fashion. Yet, when a problem occurs, it is important for such information to be readily accessible to various maintenance personnel on an on demand basis, and preferably for example using a mobile device. FIGS. 4j and 4k illustrate representative screens presented by a mobile application that can be designed to connect to the computer system of the present invention.

Furthermore, the inventors have found that the equipment related information from manufacturers for example is often subject to change and yet many enterprises do not keep such information up to date. Also, updates from manufacturer may often relate to multiple equipment models and therefore linking an update to a particular piece of equipment can be time consuming or difficult to manage.

In one aspect of the invention, the platform (10) includes a data import utility (44) that is designed to link to online databases made available by manufacturers for example, to extract information required to populate a data record (46) for a particular piece of equipment, as established using the resource profile manager (42). The data record (46), by operation of the platform (10) acts as a unified repository for information concerning a unique piece of equipment. This unique repository inherently avoids duplicate records for the same piece of equipment, and the resulting confusion and inefficiencies.

In one implementation of the invention, the data import utility (44) is configured to automatically extract relevant information or files, and link them to appropriate fields of the applicable data record (42). Alternatively, personnel engaged by the operator of the platform (10) can extract and store this information.

In a still other aspect of the invention, the platform (10) may include one or more utilities that are designed to leverage the community of platform clients (12) to engage in crowd sourced completion of tasks that benefit the platform clients in aggregate. The incentive platform (48) may be leveraged to motivate users to complete data records (42) with for example information from manufacturers. More importantly, platform clients (12) can complete a data record (42) with their own associated information or observations, and this information (subject to permissions as configured by platform clients (12) using the data access utility (24)) is then shared with other platform clients, or a defined sub-set of platform clients.

The associated information may include for example platform client generated:

(a) corrections or additions to information from the manufacturer that is relevant to maintenance;
(b) suggested maintenance schedule or tasks;
(c) best practice comments or suggestions related to maintenance;
(d) platform client generated maintenance checklists, guides or documentation (in a variety of formats); and
(e) maintenance related software tools developed by or for platform clients.

A skilled reader will appreciate that these activities through the platform (10) provide access to better information regarding for example equipment—that is more accurate, more up to date, and may reflect accumulated knowledge or know-how that normally is not made available outside an enterprise. This type of information is often not even shared within an enterprise. Different members of a maintenance team for example may have access to different insights regarding different pieces of equipment for example. In other words, the aggregation of this type of information, made available by enterprise personnel through the platform (10) may also benefit that very enterprise.

A skilled reader who is knowledgeable regarding the relevant domain will appreciate that sometimes manufacturers provide information that is incomplete or inaccurate in part because this makes them more profitable. Manufacturers and their channel partners may benefit if equipment needs to be avoidably service or replaced (where this is not covered by warranty). They benefit if their customers stock more parts that are reasonably required, or if they do not have access to self-help strategies addressing maintenance issues on their own or increasing equipment longevity.

Significant advantages can be realized by enterprises if they have access to the information or know-how necessary to minimize these factors. However, it is very unlikely that a single enterprise, especially a SME, has the resources to collect and maintain this information for a single piece of complicated equipment, let alone across the various pieces of equipment that a typical enterprise likely runs.

An important insight of the inventors is the discovery of the opportunity to address this issue by (A) creating one or more communities that possess in aggregate domain knowledge that can address these gaps in knowledge, and (B) motivating these communities to share this information, including by providing the information or documents mentioned above. These motivations may include basic commonality of interest, the fact that contributors will tend to also receive benefits from other platform clients. In addition, as discussed below, the present invention includes the incentive platform (48) which may include specific incentives designed to motivate users to contribute information that provides a shared benefit.

Another advantage of this particular aspect of the invention is data normalization of relevant information such as part numbers and descriptions for a particular data record (42), which in turn enables various analytical operations described above that would not have been otherwise possible.

More particularly, the mechanisms described provide an improved taxonomy for a variety of features of the analytics engine (50) as described below.

The analytics engine (50) may be configured to analyze maintenance documents for example by analyzing their content semantically and/or to tag maintenance documents automatically. The analysis or tagging may relate to the linking of the maintenance document to a particular data record (46), and therefore a particular piece of equipment, if this connection has not already been determined based on user initiated tagging for example.

For example, the analytics engine (50) enables the platform (10) to link in the platform (10) for example equipment or parts that relate to the same product, but for which there may be different product names or even part numbers. This is a common problem that can result in mistakes, inconvenience, lost time and lower productivity. For example, one distributor may use one part number for a product, and another distributor may use another part number for the same product. One implication is that businesses sometimes do not identify that the same part may be obtained from another source at a lower cost. The platform (10) enables these distortions to be minimized and removes market barriers by implementing semantic operations through the analytics engine (50) so as to automate the mapping of different identifiers that relate to the same product.

In one implementation of the invention, the analytics engine (50) is used to automatically analyze product related information, and apply one or more semantic analysis operations to identify product information records that relate to the same information. In one implementation, related records may be identified to an administrator for confirmation. If confirmed, two or more identifiers that relate to the same product or service may thereafter be automatically mapped to one another for the purposes of the various operations that utilize those identifiers.

In another implementation of the present invention, confirmation of the relationship between different identifiers may be promoted to the platform's user base for confirmation, for example to selected users, whom the platform (10) has confirmed may have a higher than average knowledge based in a domain relevant to the product or service in question.

In a particular implementation of the present invention, the platform (10) provides intelligent product and parts lists that automatically ensure that one entity or record exists on the platform (10) for each distinct product, part or service, regardless of different taxonomies that may exist for the same product, part, or service.

In another aspect of the invention, the platform (10) includes a logger (52) that is operable to track the interaction of users with a particular maintenance document, which may include viewing, downloading, forwarding, rating, or recommending a maintenance document. This information may be logged by the logger (52) to a profile associated with the maintenance document. The analytics engine (50) may include one or more scoring mechanisms for associating a score from time to time with a particular maintenance document.

One aspect of the incentive platform (48) may include incentives for users to create high quality maintenance documents, based on output from the scoring mechanisms.

In another aspect of the invention, the platform may include a suggestion engine (51). The suggestion engine (51) may be part of or linked to the analytics engine (50). The suggestion engine (51) has been developed to analyze information available on the platform (10) for the platform client, for example, their equipment list and optionally their maintenance list or inventory levels of parts. The suggestion engine (51) can actively suggest maintenance activities for example a different maintenance schedule that based on best practices determined across a relevant community associated with the platform (10) appears to provide better results.

For example, the suggestion engine (51) may be used as a mechanism to make up for gaps of knowledge that may exist in a particular platform client's maintenance team, by leveraging the collective know-how of a community by operation of the platform (10). The suggestion engine (51) may also be utilized as a mechanism to promote preventative maintenance as opposed to responsive maintenance, and also better allocation of resources for a better overall result to the enterprise.

The suggestion engine (51) may also be utilized to suggest alternative products for example a new machine to replace an existing machine or a replacement part or a service. The suggestion engine (51) may be used for example by manufacturers or distributors given access to this tool by the operator of the platform (10) to up sell their customers through the platform (10). A skilled reader will understand that the suggestion engine (51) is unique and innovative in that it (A) automatically accesses deep information regarding for example the equipment that a particular customers uses, how this equipment uses, what other equipment the customer may use, and (B) uses operations embodied in the analytics engine (50) to generate automatically intelligence concerning a customer and their possible product or service needs that according to prior art methods and solutions are either not possible, or are accumulated based on costly sales efforts directed to accessing intelligence regarding a customer's operations. One contribution of the invention therefore is the provision of a scalable tool that provides intelligent suggestions to for example manufacturers or distributors regarding specific requirements of a customer or potential customer. These suggestions may be used to for example direct sales/marketing efforts more efficiently, and improve return on investment from these efforts. Customers or potential customers receive sales/marketing related communications that are relevant to them and timely, and therefore a much better received than sales/marking communications that are enabled using prior art methods and solutions.

Therefore in another implementation of the present invention, the platform (10) may be operable to generate leads, and provide these for example to a manufacturer or a distributor. In one possible implementation, distributors may pay for these leads. In a particular implementation of the invention, the platform (10) may include for example a transaction infrastructure for processing transactions for example between a platform client (12) and a distributor who is also linked to the platform (10) in regards to the purchase of a part or of a machine. As further explained below, the platform (10) may provide the infrastructure for supporting the deployment of applications (70) for example for ordering parts/products from a particular source. Linking an ecommerce utility for ordering and purchasing parts/products to the platform (10) of the present invention enables a manufacturer or distributor to utilize unique and innovative features, and also decreases the costs associated with development and maintaining such an ecommerce utility.

In addition, the suggestion engine (51) may also be configured to automatically analyze information regarding a platform client (12) available through the platform (10) including for example (i) their use of for example equipment, (ii) the current status of the equipment, and automatically generate one or more recommendations or suggestions regarding equipment, parts, or services that may provide an advantage to the platform (10). For example, the suggestion engine (51) may enable the automated analysis of the operations of a platform client (12) and suggest (i) purchase of a different type of equipment, and/or (ii) operation or maintenance of the equipment in a different manner that enables costs to be lowered, provides better return on investment, improved productivity or some other improvement in results.

In one example of the implementation of the present invention, the platform (10) iteratively collects insights into maintenance of equipment, for example by aggregating the actions taken by different users and resulting outcomes such as improved performance or increases in life cycle of a particular piece of equipment. The platform (10) is configured to track the current life cycle and performance of Equipment A being used by platform client X. The platform (10) may access best practices for Equipment A, generated by the analytics engine (50), and based on the applicable best practices sends a message to platform client X by operation of the suggestion engine (51) suggesting for example as follows: "Consider changing belt to maintain performance."

Leveraging the community in connection with maintenance provides many benefits. Manufacturers often have very little information regarding how their products are actually used. A particular piece of equipment in the field may be used in different ways yet manufacturer provided operating conditions are generally provided in a generalized manner. The platform (10) provides a mechanism to identify different use profiles and to associate maintenance documents with each use profile. Manufacturers typically design their recommended operating procedures based on very conservative recommendations rather than actual performance data. Enterprises are generally interested in trying to operate on a "just in time" basis with safeguards, rather than ordering equipment in advance that may stay in inventory for extended periods of time. Conversely, because manufacturers have limited access to actual performance data, even with attempts to make conservative recommendations, sometimes operating procedures are incorrect and furthermore it often takes some time before manufacturers realize this, and then communicate this to their customers. This sometimes is exacerbated by concerns regarding exposure to claims if equipment breaks down. The platform (10) significantly improves the access to accurate information obtained based on collective insight.

Another advantage is that platform clients (12) can benchmark the performance of their equipment and/or their maintenance personnel based on industry standards that can be established automatically through the platform (10). Information of this nature was not readily available prior to development of the platform (10).

In another aspect of the invention, geo-location information or environmental information may be collected and associated with particular equipment through the data records (46). This information may be utilized to discover insights into equipment performance that may not have been otherwise available such as the impact of environmental conditions such as temperature or humidity on performance. Again, the collection of such information and making it available to the communities enabled by the platform (10) is far more likely to result in useful discoveries than individual analysis.

On-Boarding

Another benefit of the mechanisms described in this section is improving ease of adoption. A significant barrier to adopting a CMMS or adopting a new CMMS is the time that is generally required to populate the database of a prior art CMMS. This on-boarding process is significantly improved by operation of the platform (10), where data records (42) for equipment are well developed and easy to find and select in order to build a platform client's equipment list. Furthermore, the platform (10) links to each data record (46) various available maintenance lists, maintenance schedules, know-how records, and so on ("maintenance documents"). A user adopting the CMMS can automatically view available maintenance documents, and link them to his/her equipment list.

In one aspect of the invention, the platform (10) includes or is linked to an on-boarding system (54) that assists users to on-board to the CMMS (30), for example by (A) automating certain on-boarding steps and/or (B) automatically suggesting certain resources or connections available through the platform (10).

For example, the on-boarding system (54) tracks partial information provided by a user, for example in filling out a form that is part of the equipment list being completed by the user. The partial information is compared to the available data records (46) to find one or more matches, and if a match is found auto-populates one or more fields of the form with relevant information from the matched data record (46), or provides a list of close matches for user selection. Also, the on-boarding system (54) may invoke the analytics engine (50) to analyze information provided by the platform client (12) or related to the platform client (12), such as the equipment list, but also information concerning the platform client (12) that may be stored to a platform client profile (56). This information may be used to find for example maintenance documents of interest to the platform client user. This information may also be used to initiate social media interactions with users with similar maintenance responsibilities by operation of the social networking platform (16) subject to permissions established by the platform client (12).

It should be understood that the social networking platform (16) may be used to suggest friend connections, for users to friend one another based on common interest (for example similar responsibilities, issues with similar equipment and so on). The power of the social web is leveraged by the platform (10) in order to enable users to connect with one another to form (one on one and group) connections based on maintenance issues. The platform (10) enables connections to be made between people requiring information and those willing to provide it (including by operation of the incentives embodied in the system), thus disseminating information in an efficient way that may not have been available through any means before.

Generally speaking, most platform clients (12) will want to keep information concerning their maintenance operations anonymous, or at least inaccessible to competitors. For example, Platform Client A will not want its competitor to know that it is having trouble getting a key piece of equipment to work. Or alternatively, Platform Client A does not want to expose itself to raiding of key resources who contribute to much better than average performance of another key piece of equipment. Therefore in one aspect of the invention, platform clients (for example an administrator) may filter the availability of certain information and otherwise mediate social media interactions if this is desired.

In one particular aspect of the implementation of the invention, the platform (10) may include a content delivery platform (60) that enables content to be made available through the platform (10) to a wide variety of network connected devices, in a wide variety of formats and media. For example the content delivery platform (60) may be used to format how-to guides submitted by users so that they are available using a mobile device.

Content may be rated by users and then promoted through the platform based on relevance. Recommended content may result in triggering of incentives by operation of the incentive platform (48).

The platform (10) also may include a messaging utility (62) that enables users to share information or collaborate with colleagues or friends established using the social networking features of the social networking platform (16) (for example users may select as friends in their network established through the platform (10) only those individuals that they are comfortable or are not with a competing organization for example. The messaging utility (62) may be utilized to send in-platform messages to the user's network through the platform (10) with a question as to who may know how to repair a broken machine.

Sharing Other Resources

The present invention is also configured to enable the sharing of other resources apart from information as described above.

A reader knowledgeable in the relevant domain will understand that many enterprises have spare parts that they do not require immediately, and in fact they may never need because they are for a machine that they no longer use. Some have estimated that there are hundreds of billions of dollars in parts inventory that are not required, in North America alone.

Another aspect of the invention is to leverage the communities created by operation of the platform (10) in order to match platform clients that require a part for example, with other platform clients who are willing to sell the part through the platform (10). This may be accomplished as follows:

(A) the platform client (12) determines that they need a particular part, or they may soon need a particular part, or this is suggested by the suggestion engine (51);

(B) the platform identifies a group of other platform clients (12) who may have surplus parts by (i) accessing inventory information available to the platform (10), (ii) through a third party platform linked to the platform (10) (such as an inventory management platform), or (iii) analysis of the various equipments lists of the other platform clients (12);

(C) the messaging utility (62) sends a message to platform clients (12) who are likely to have surplus parts and have elected to receive such requests;

(D) The platform (10) matches the platform client requiring the part to one or more other platform clients willing to provide the part, and enables referral communication between them.

Many other implementations are possible. Available parts linked to willing sellers may be filtered for example for geographic proximity. An obvious advantage of the platform (10) is in connection with urgent requirements for parts when the part is not available locally from the manufacturer or its channel partners. It is possible that the same part may be available from another enterprise close by, and this enterprise does not require the part. This provides an opportunity to the first enterprise to repair a crucial piece of equipment much more quickly, and the second enterprise is able to monetize (perhaps even at a premium over the normal list price) an asset that may otherwise have been obsolete.

The transactions may be enabled using the transaction utility (32), and the operator of the platform (10) may retain a commission.

A group of platform clients may also collaborate by participating in group buying through the platform (10). In one aspect of the invention, the platform includes or may be linked to an electronic Request for Quote ("RFQ") system (64). The RFQ system may track identical or similar requirements across several platform clients, possibly automatically based on analysis of the platform clients' inventory lists and associated maintenance requirements (as determined by the platform based on observation of community behaviour). Platform clients (12) may be connected to one another and asked whether they want to participate in a group RFQ to one or more suppliers. The RFQ system (64) includes RFQ features similar to those in other electronic procurement platforms including group buying platforms. Importantly, however, linked to the platform (10), the RFQ system (64) is operable to identify group buying opportunities that would not have otherwise been identified, and enable platform clients to act on these in order to realize significant savings. Another key advantage of the RFQ system (64) is that it can predict when and how and RFQ should be sent to vendors, based on access to information regarding platform clients' future requirements in aggregate across a platform defined community.

Incentive System

The incentive platform (48) enables a variety of incentives to encourage desired behaviours from different users of the platform. For example, loyalty points or badges may be associated with enhancement of data records (46) or correction of data records (46) or submitting a new maintenance list or best practices document or video.

The incentive platform (48) may also incorporate various gamification processes for encouraging users to share information or resources.

In one aspect of a possible implementation of the invention, platform clients may receive discounts in the normally applicable commissions for example based on a contribution score defined for them by operation of the analytics engine (50).

Analytics

In one aspect of the invention, the analytics engine (50) is operable to analyze information made available to the platform (10) and automatically generate a variety of metrics such as for example benchmarks for equipment performance or maintenance personnel performance.

For example the analytics engine (50) can:

(A) Harvest aggregated data (such as machine run time data) to drive analytics for decision support and intelligent maintenance;

(B) Optimize maintenance activities for example based on maximizing production or minimizing cost;

(C) Personalize user experience in part to improve compliance with best practice based maintenance parameters;

(D) Identify synergies between platform clients and creating connections between them, including for sharing information and resources;

(E) Analyze information to identify best practices; and (F) Predict and intelligently recommend the proper maintenance schedules, tasks and lists to users who desire such information based on equipment usage or queries asked, and offer recommendations to optimize their processes, including procurement of parts, equipment, etc. or offering specialized data intelligence.

The analytics engine (50) may implement various analytics applications and/or analytical processes. The analytics engine (122) may include a semantic analyzer for example for analyzing semantically for example text captured from various communications that are part of the social media interactions initiated using the social networking environment (104) of the present invention. Access to the analytics engine (122) may be controlled and managed by operation of the administrative utility (152).

The analytics engine (122) may enable an administrator for example to construct and obtain answers to various queries, or initiate the generation of various reports based on data output from the analytics engine (122).

The analytics engine (122) enables enterprises to better understand the marketplace in which they operate. Using the analytics engine (122), the platform (100) takes advantage of the front line workers' viewpoint and acts as the eyes and ears of the organization at the critical "last 3 feet" where consumers are making the actual purchase.

The analytics engine (122) may incorporate or link to a suite of statistical and advanced analytic tools to monitor the situation at particular levels of interest, such as for example retail. Given the deployment of the platform (100) in a way that enables targeted information from selected groups or interactions between selected groups, the platform (100) operates as an early warning and competitive intelligence system.

The analytics engine (50) is operable to provide insights that provide a first line data indicator of trends in equipment use and maintenance that are currently not available, or only are available based on collection of survey responses which is known to be costly to obtain and based on low participation the results may not be representative of trends.

The analytics engine (50) provides business intelligence that can be segmented by local, regional, national and internationally.

Dashboard

The web presentment utility (31) is operable to present a dashboard (66) that enables platform client users to access the various platform features. The dashboard (66) may be implemented using a semantic user interface that is highly personalized and provides an intimate user experience, thereby driving technician adoption.

The dashboard (66) may be configured for example to present aggregated data across different industries for example for the same equipment.

Add-Ons

In one particular implementation of the invention, the platform (10) is implemented using an API (68). The API (68) enables interfaces between the server application (26) and for example third party CMMS's, and also enterprise computer programs (36). The API (68) also enables the server application (28) to support applications (70) that may be developed by members of a development community who may be part of the community enabled by the platform (10). The operator of the platform (10) may provide one or more tools that enable developers to develop and launch applications (70) that operate on the platform (10) by means of the API (68).

The platform (10) may connect to intelligent appliances through the API (68) for example to harvest information regarding equipment performance.

The platform (10) may initiate the creation of community activities to perform work that adds to the value and traction of the platform (10), for example translation of data objects related to the platform (10).

The platform (10) may include a variety of applications (70) that may drive platform activities such as the completion of a maintenance task list. For example, a graphical user interface may be provided based on content likely to be of interest to a maintenance technician, such as for example a calendar including revealing content, where uncovering the content requires completion of all items in a task list.

The platform (10) may include a document version system that may be implemented using functionality similar do a document management system (DMS) for tracking and storing information objects (including documents and images), including different versions. The document version system may be used to manage for example different versions of product or equipment manuals, and other similar documents.

The platform (10) may be linked to various wearable devices where the combination of the wearable device with the services available from the platform (10) is advantageous to users. For example, a wearable computer with an optical head mounted display (OHMD) may be connected to the platform (10). The OHMD may include a computer display that allows users to view data, including data related to objects also in the field of view. Optionally glasses similar to for example Google Glass™ may be designed to have protective features such as safety glasses. A system that includes the platform (10) and glasses adapted for information capture and display has numerous advantages. A network connection may enable the glasses to connect to the platform (10) and for example: (a) match equipment in the field of view to a database linked to the platform; and (b) retrieve relevant information based on a match and display the data in a way that is associated on the display with equipment in the field of view. This allows for example maintenance workers to access information from the cloud by scanning a facility visually using their glasses. For example, the platform (10) may allow a user to select a scan for assets requiring maintenance mode, whereby the user scans visually and in the display visual objects are presented that bring attention to assets in the field of view (in whole or in part) that require maintenance. Even if an asset is not in the field of view, the display may show visual objects that direct the user in the direction in which assets requiring maintenance are located. The process may be iterative and incorporate way-finding features.

A user may then use the glasses to access other related information such as relevant work orders or video tutorials relevant to maintenance tasks, based on assets located using the glasses.

A scanner made part of the glasses may also be used to scan a QR code in order to locate and retrieve relevant information from the CMMS (30). Similarly a bar code or other identifier may be scanned in order to enter an asset to the system.

The glasses may include a communication utility. This may be used to contact a help desk such as one associated with a manufacturer or distributor of an asset, in order to ask questions. By connecting the glasses to the CMMS (30), a worker can easily access in the field additional relevant information in order to initiate a call in the field, and the worker can also capture and automatically send images to the help desk worker. This can save significant time and provide better convenience when engaging with an outside help desk is necessary.

A communication interface may also be used to connect to diagnostic equipment and access data and view reports on the glasses based on the data in real time. This can help improve the speed with which maintenance issues are addressed.

The glasses may also be used for uploading information to the platform (10) including for example photos of equipment or parts of equipment, using a camera that is part of the glasses. Various other features and workflows are possible.

Social Networking Environment

The social networking environment should be understood to include conventional known social networking aspects but departs from the prior art by incorporating these into a resource management or maintenance management related platform. The social media interactions themselves are novel, as they relate to community interactions around sharing of information and resources through a web enabled platform, which did not exist prior to the present invention.

Certain possible attributes of the social networking platform (16) are described. The web presentment utility (31) is operable to generate a series of web pages, as directed by the social networking platform (106) so as to define a series of user interactions and/or workflows, including social interactions that define the social networking environment described herein.

The present invention enables the connection of two or more personnel (across enterprise locations or across different businesses such as manufacturer-distributor-retailer) that may not have otherwise met yet together represent a combination of access to information, expertise, local knowledge, maintenance knowledge, equipment knowledge, or other facts that, when brought together within a social networking platform that enables cost effective, familiar and engaging social interactions, can provide and create synergistic value around important resource management objectives having a shared benefit across two or more platform clients.

The social networking platform (16) may be used to implement a variety of social media interactions that promote objectives of the platform (10). For example, social media interactions between users may be initiated so as to (A) identify users engaged in similar activities, such as maintaining similar equipment, or indicating a similar knowledge base, (B) suggest that such users "friend" one another through the social networking platform (16), (C) enable communications and social media interactions between "friended" users, and/or (D) encourage users in social networks to provide one another a "knowledge rating" in one or more particular domains. The analytics engine (50) may be configured to aggregated knowledge ratings for users, and optionally using other metrics, calculate a "knowledge score" or equivalent for relevant users. Knowledge scores may be associated with incentives, and also enable the operator of the platform (10) to target users who meet certain knowledge score thresholds for example to review information or prepare documents (such as service manual addenda) for dissemination and use through the platform (10).

A skilled reader will understand that it is an innovative contribution to the relevant art to conceive of building a platform that attracts users who may have specialized and valuable knowledge, but which is not used outside of their organization, and linking these users with one another that enables dissemination of knowledge and expertise, thereby improving productivity of participating organizations as a whole.

The system and method of the present invention is operable to distribute knowledge in order to improve maintenance related outcomes to a group of platform clients.

The social networking platform (16) may be generally implemented using one or more application servers. For example, the social networking platform (16) system that may include an application server and graph servers. The application server manages a member database, a relationship database, and a search database. The application server may also contain a matching engine to enable the suggestion of friend combinations based on a series of criteria. Friend suggestions may require acceptance, after which they are added to relevant social graphs managed using the graph server. The matching engine may suggest friend matches based on criteria such as similarity of industry, but filtering matches between competing organization established for example based on user defined competitors lists. The matching engine may include various functions or features for matching individuals based on a variety of criteria including for example demographic attributes, personality traits, and also factors related to the enterprise objectives. For example the matching engine may be used to match friends within groups defined by the social networking environment based on similarity or dissimilarity (depending on for example campaign objectives) of experience, training, maintenance certificates and so on. Matching may also be based on attributes associated with for example the retail stores in which users may operate. For example, users may be matched with users who work at similar businesses or maintain similar equipment. The purpose of matching user 1 with user 2 may be to enable user 2 to share tips with user 1 in an engaging atmosphere that both user 1 and user 2 are familiar. The social interactions enabled by the social networking platform (16) provide an informal setting for user 1 and user 2 to socialize and in the process share tips regarding maintenance.

The social networking platform (16) may also be configured to implement a number of community interactions, and also activities initiated by the operator of the platform (10) such as crowd sourcing of activities that add value to the platform (10). In one example, the social networking platform (16) may be used to create and promote projects related to the translation of content associated with the platform (16). In one possible implementation of the invention, the platform (10) includes a managed crowd sourcing system that enables the operator or one or more of the platform clients (12) to design a campaign to provide incentives to other users to translate content. For example, a manufacturer or a distributor may provide incentives through the platform (16) to platform clients (12) or their personnel to create translations of technical information related to their products. Translations may be distributed through the platform (10) based on a number of different monetization models or incentive models that may be supported by the platform (10).

Workflow

Various workflows are described in this disclosure. One workflow and computer implemented method of the present invention includes:

(A) a plurality of platform clients configuring the CMMS to define a list of equipment used in their business; and (B) The CMMS launching and thereby enabling the platform clients to access a plurality of intelligent features that enable them to manage the maintenance of their equipment, including based on the collective information, documents, or knowledge shared or generated by operation of the CMMS.

Example in Operation

The operation of the invention may be illustrated in a use case.

In a typical case, a machine breaks down on the manufacturing floor causing production to stop and severe disruption throughout the plant. Worse, each hour of downtime may cost a business a significant amount of money in lost revenue. Many businesses rely on machines that may no longer be in production; in fact the manufacturer may no longer be in business. Many businesses have significant spare part inventory on hand, but they may not be the right parts, or the maintenance personnel of a business may be uncertain whether they are the right part because there is no information or documentation to confirm whether it is the right part or not.

A maintenance manager in these circumstances may call a local supplier, who may be able to ship the correct part. But it is fairly common for some parts to require up to six (6) weeks in lead time for delivery.

In addition, in some cases the machine part arrives, or is available on hand, but the manual cannot be found and the maintenance personnel is uncertain as to how to install the part and/or how to carry out the repair.

In the interim, production may be at a standstill, at least in part.

In contrast the computer platform of the present invention prevent such a scenario by using real time intelligence from maintenance related content curated in its database from a variety of sources, including based on sharing and collaboration from users of the computer platform from across industries and around the world, to make proactive decisions that will save users money and make maintenance, and thus production, more streamlined, productive and efficient, while avoiding costly disruptions.

The following representative scenario illustrates some of the advantages of the present invention:

(A) A machine that is important in the business of a user breaks, and more importantly, the computer platform of the present invention optionally predicts that the machine may be about to fail (perhaps within a defined lead time) based on the maintenance records of the user and data gathered from other users with the same machine and comparing maintenance, performance and runtime data between them.

(B) In one aspect, the computer platform may determine from the maintenance records of the user the type of part needed for the broken machine and searches for the part among the many users in the system that have the same machine and the same parts. This information may be discovered for example based on one or more text based searches (using for example machine make, model and serial number, or part number) and one or more contextual searches (similar industries, similar business type, similar suppliers, etc). A possible outcome is that the computer system of the present invention discovers those users having the required part in their inventory and then informs them that the part is needed somewhere else and a communication is sent through the platform to inquire whether they would be willing to sell that part to the user in need. This offers the 'selling user' a way to monetize slow moving inventory that is otherwise very expensive to keep and is often on their balance sheet for years.

(C) In another aspect, the computer system scans for the maintenance and repair procedures from information and documents (such as manuals) linked to the platform (10) through the various platform clients, including for example records or manual annotations created by personnel for various platform clients who are responsible for maintaining the same or similar equipment, so as to extract insights or specific information or documents. Based on permissions that may be defined by the contributing platform clients, this information may be shared or used in aggregate. This allows the platform (10) to enable access to information that otherwise would not be accessible). For example, the platform (10) provides access to an internally created maintenance procedure or checklist document, created by a knowledgeable maintenance technician, and which may represent an important investment by one platform client, that provides value to them but that they cannot currently monetize externally. The platform (10) creates a market for such information or documents in exchange for sharing of the information. The 'right' maintenance procedure may be chosen based on relevancy as determined by a variety of metrics, including but not limited to, user comments, rankings, most often used, etc. The MA system stores and monitors this metadata and dynamically determines each time which is the correct information to choose from based on metrics.

(D) In one aspect of the invention, users access offers of the right part automatically and optionally an associated optimum maintenance procedure and/or documentation needed to carry out the repair. The documentation may include more information, better information, or user validated information, which provide significant added value over what is generally available, which is manufacturer generated information which is often incomplete or not detailed enough.

(E) Additionally, in another aspect of the invention, the user carrying out the repair may access help through the platform (10) by asking questions and communicating with other experts throughout the community or communities enabled by the platform. These may include individuals who know or are responsible for the same kind of machine in different companies, again identified by operation of the computer system.

(F) In another aspect of the invention, the computer system may include or link to a mobile application, or may enable mobile access to one or more platform functions, that for example enable a user, once in the vicinity of the broken machine, access from the platform of all relevant information as described. This may be accessed for example by (i) the user accessing a machine list (which may include images) configured for the user, or (ii) the user scanning a barcode from the machine which is sent to the platform and which initiates retrieval of relevant information. This allows the user to access for example relevant manuals and schematics associated with the repair in the field and possibly initiate repair immediately. Prior art methods and solutions generally require search for paper based or electronic documents that generally are not stored in an organized fashion. Especially in relation to a critical maintenance or repair procedure in relation to an important piece of equipment, the present invention provides significant advantages to users.

(G) In another aspect of the implementation of the invention, once the repair is complete and the broken machine is back online, the computer platform of the present invention may intelligently learn how ongoing performance of the machine compares to the same machines used by other users in the system and benchmarks it against the rest, using information that the computer system of the present invention automatically collects from a variety of sources, but primarily from a computerized maintenance management system (CMMS).

(H) Using functions of the analysis engine (50) (including for example algorithmic operations implemented to the analysis engine (50)), including for example artificial intelligence operations, these operations may provide valuable data and information through the suggestion engine to the user to keep the machine in top working order, or in other beneficial ways, as compared to what other users of the computer system may experience. For instance, if a user in company A is experiencing less machine downtime due to failure versus company B, the computer system may provide company B with a reason why and a solution of how to remedy; for example, a different preventative maintenance schedule, or a lower operating temperature. This information may be assembled, analyzed and recommended by the computer system of the present invention in an aggregated and anonymous fashion, which means no identifying information is gathered or provided.

(I) Over time, a user may continue to use the computer platform of the present invention to acquire or access missing data/information to close the user's gap in knowledge on anything maintenance related in their business or field of interest. The user can obtain benchmark data against industry (performance of people and equipment); recommendations on capital purchases and reasons for and timing of (based on actual performance data); obtain best practices based on environmental factors (e.g. geo-position of the equipment, like altitude, which affects equipment performance); make decisions regarding whether retrofits or upgrades are required (and be recommended parts, equipment, service or intelligence needed) based on actual real time information and machine data from users throughout the system; and receive targeted ads from relevant vendors based on specific or group needs, including discounts or special offers generated by group buying where buyers are clustered, for specific parts, equipment, services, etc.

(J) When parts are needed, especially everyday items such as indirect MRO (maintenance, reliability and optimization) parts, the user may rely on the computer system to automatically control when, the quantity, and how the parts are procured and delivered to the user, based on user preferences, and with minimal input or oversight needed from the user. For instance, a vendor may deliver parts to a user based on the user's 'hot buttons'—e.g. fastest delivery, lowest price, etc.—that the computer system of the present invention communicates to the vendor, and the time when the user actually needs the part. This builds efficient supply chains and strong, trusted relationships between users (a vendor is also a user of the computer system of the present invention). This also allows the user to have a streamlined inventory, carrying only parts he will need and use in a reasonable timeframe, thus keeping expenses down and ensuring no stock-out situations that could lead to costly downtime in production.

(K) Each time the user completes any task, such as keying in critical fields such as 'cause of failure' with useful and descriptive information, updating maintenance lists, answering another user's questions, etc, s/he may earn points as a reward that can be redeemed/traded/sold for valuable goods and services on the computer system of the present invention.

(L) As previously stated, the computer system learns the user's maintenance procedures and machine equipment behaviours, including those of all users and machines across the entire community, the computer system of the present invention may recommend service before unscheduled failure based on inputs gathered in real time and comparing it to other data across other companies. The goal for the user is to always have scheduled downtime, rather than unscheduled downtime, which represents a paradigm shift in the user's maintenance experience, changing it from reactive to proactive/preventative maintenance. This in turn greatly benefits the user's production experience.

(M) When 'scheduled service' has been determined for a machine, the computer system of the present invention may recommend and assist the user in ordering and organizing all of the necessary parts, service providers, contractors and technicians that are needed ahead of time so that all critical stakeholders and components are available at the time they are needed. The computer system of the present invention, in one implementation, is configured to predict well in advance of when the repair or service is needed on the machine, saving the user money and preventing unwanted or potentially dangerous situations.

When controlled shutdown of the machine is initiated by the user, the computer system of the present invention may recommend a set of procedures on what is needed to be done to successfully carry out the work. In one implementation, the computer system provides a recommended schedule and/or activities list for the ongoing maintenance and running of the machine, based on the user's 'optimal use' equipment profile for that machine—such as maximized production or minimized unscheduled downtime—either of which could incorporate different strategies to achieve such goals.

General

Depending on the particular implementation and various associated factors such as the resources of the mobile device, wireless network parameters, and requirements of the content distribution of social media platforms, different implementation architectures may be used for the present invention.

It should also be understood that the server (20) may be implemented as one or more servers in any possible server architecture or configuration including for example in a distributed server architecture, a server farm, or a cloud based computing environment.

Figure 5:
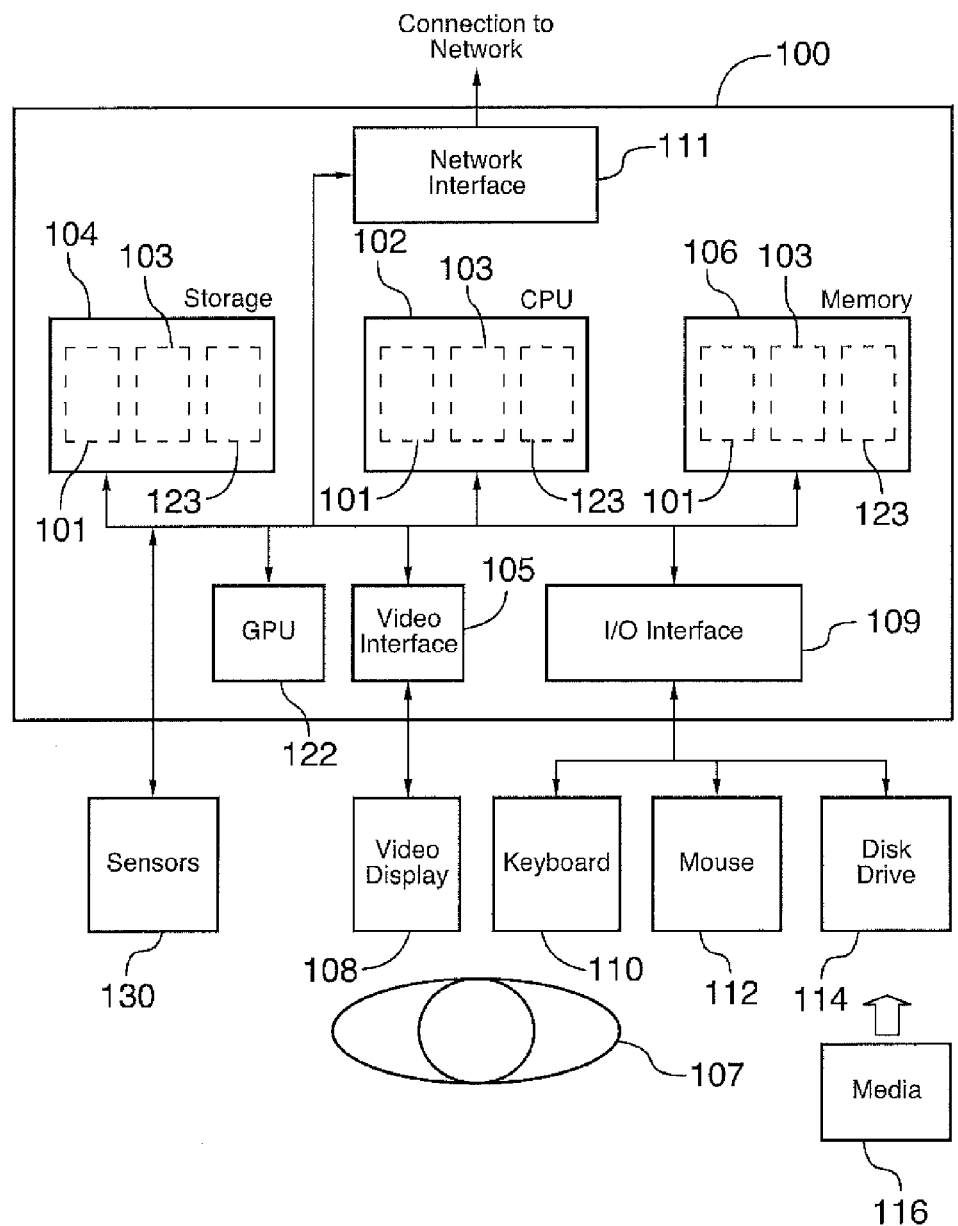
FIG. 5 illustrates a possible generic computer system implementation of the present invention.

The present system and method may be practiced in various embodiments. A suitably configured computer device, and associated communications networks, devices, software and firmware may provide a platform for enabling one or more embodiments as described above. By way of example, FIG. 5 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

Various functions described may be made accessible using one or more mobile devices, including by providing a mobile application for accessing features of the computer network service described, or accessing the computer network service using a mobile browser. The mobile application described may be implemented to any mobile platform, including the iOS platform, ANDROID™, WINDOWS™ or BLACKBERRY™.

It will be appreciated by those skilled in the art that other variations of the embodiments described herein may also be practiced without departing from the scope of the invention. Other modifications are therefore possible.

A skilled reader will recognize that other example various extensions to the features and functions described are possible, such as incorporate of various semantic analysis functions to the analytics engine (122).

It will also be appreciated that the block configurations, screen shots, and flow charts provided herein are for illustrative purposes only and various modifications thereof are applicable within the principles discussed herein.

Although the above principles have been described with reference to certain specific embodiments, various modifications thereof will be apparent to those skilled in the art without departing from the scope of the invention and the claims appended hereto. Other modifications are therefore possible.

Advantages

Various advantages of the present invention have already been mentioned above. Further advantages of the invention are described below.

The present invention provides:

A unique and innovative CMMS offering.

A CMMS platform that integrates parts and service procurement, thereby leveraging valuable transaction information to enable the aggregation of information and supplier terms for shared benefit.

A CMMS platform that integrates group buying features for savings made available across platform client groups.

A resource management platform that integrates a social networking platform in order to facilitate information and resource sharing thus providing significant added value to platform clients.

A platform that can function as a cloud based solution, but also can be implemented inside an enterprise firewall, while being configured to enable export of permitted information to support shared services.

A robust and scalable, web enabled platform that allows enterprises to run their resource management and all of their resource management activities.

A unique and innovative business model that provides free or low cost access to a valuable platform, delivering savings to platform clients, and delivering a transaction based commission to the operator of the platform.

A web based platform that is accessible from many different devices, including smart phones and tablets, and provides easy access to maintenance related information and activities through a single, intuitive interface, thus replacing costly and inconvenient paper processes and/or multiple technologies used for the same functions;

A platform that enables platform clients to share information, on their terms, in a way that provides benefit back to those sharing A platform that enables crowd-sourcing of accumulation of valuable intelligence regarding maintenance of equipment.

A platform that enables platform clients to create efficiencies and cost savings.

A platform that is flexible in that it enables platform clients to choose between operating in a multi-tenant cloud based architecture, or behind a firewall in an implementation that enables the extraction of information that supports shared services.

A CMMS that integrates with a robust transaction platform thereby providing access to rich transactional data for shared benefit, and single point platform for tracking maintenance activities and managing related transactions.

A platform that enables platform clients to align around the resolution of technical and supply-chain problem and the improvement of workflow.

A platform that enables platform clients to improve their business operations and increase business productivity.

A CMMS that helps avoid machine failure, machine downtime, lost productivity, and significant costs associated with additional parts/services requirements.

A platform that enables a new community that did not exist before, a business-to-business community based on sharing of information and resources for shared benefit.

A platform that leverages a platform generated crowd in order to provide access to a broader supply chain, broader and deeper technical expertise, group buying power.

A platform that uses the platform generated crowd to have a greater, group impact on suppliers by encouraging improvements in product designs, manufacturing quality, service packages and so on.

A platform that enables for the first time mass collaboration in connection with equipment maintenance using a social internet based approach.

A platform that enables value to be unlocked from inventories that would otherwise be obsolete A new model for "social-networking-for-business".

A platform that allow for the first time auto-populating a user's CMMS data records and databases, auto-generating records (such as asset lists of a facility, parts used with assets, recommended maintenance schedules and procedures, etc), auto-completion of partial records, for easy on boarding and ongoing use of the CMMS.

A platform is provided that predicts and intelligently recommends the proper maintenance schedules, tasks and lists to platform clients who desire such information based on equipment usage or queries asked, and offer recommendations to optimize their processes, including procurement of parts, equipment, etc or offering specialized data intelligence.

The invention claimed is:

1. A system for managing maintenance of a plurality of resources such as equipment or devices, the system comprising:
   a. a plurality of computer terminals linked to a computer network, each computer terminal associated with an individual; and
   b. one or more computers executing a computerized maintenance management system as a computer network service made available to users of a plurality of clients using the computer terminals;
   wherein the computerized maintenance management system (i) tracks maintenance activities of users associated with management of the plurality of resources across at least two of the plurality of clients, (ii) extracts data representing an equipment performance or trend of one or more of the plurality of resources from the maintenance activities, and (iii) enables the users to upload information or documents related to resource management to the computerized maintenance management system, and extracts from such information or documents an information set;
   and wherein the computerized maintenance management system analyses the information set and generates automatically one or more suggestions representing at least one of: suggested maintenance actions, product and service requirements for clients, and communicates the suggestions to one or more clients for whom it is determined that the suggestions are relevant.

2. The system of claim 1, wherein the suggestions include preventative maintenance actions.

3. The system of claim 1, wherein the computerized maintenance management system monitors the performance of a set of resources associated with varying maintenance actions from the plurality of resources, and extracts best practice information based on one or more resources that perform the best, and uses these best practices to generate the suggestions.

4. The system of claim 1, wherein the computerized maintenance management system includes one or more data filters for filtering confidential information, sensitive information, or information that a client elects not to share, from the suggestions.

5. The system of claim 1, wherein the computerized maintenance management system access one or more inventory management tools and automatically orders a resource from a supplier based on the suggestion.

6. The system of claim 1, comprising a social networking platform that enables clients to selectively share maintenance related information.

7. The system of claim 6, wherein the social networking platform enables clients to aggregate product or service requirements in order to share costs.

8. The system of claim 6, wherein the social networking platform enables clients to permit their inventory information to be accessible, or accessible in part, by one or more other networked clients selected by them, in order to share inventory, including parts inventory.

9. The system of claim 8, wherein the computerized maintenance management system allows clients to search for required parts from the networked clients based on part parameters and geographic parameters.

10. The system of claim 9, wherein the computerized maintenance management system automatically detects gaps in a first client's inventory based on its resources, and automatically suggests inventory available from its networked clients.

11. The system of claim 1, wherein the computerized maintenance management system comprises:
    a. the computer network service; and
    b. a local computer system component that connects to the computer network service;
    wherein the local computer system includes an export utility that permits a client to selectively determine the information to be exported to the computer network service for storage to a data store for use in routines using information across a plurality of clients.

12. The system of claim 1, wherein the computerized maintenance management system includes or connects to a semantic analyzer for determining that two or more information sets relate to a similar resource or to the same resource.

13. The system of claim 3, wherein the best practice information includes a suggested maintenance schedule for a resource.

14. The system of claim 1, wherein the suggestions include one or more of:
  a. purchase of particular new piece of equipment, or part; and
  b. a particular maintenance action.

15. The system of claim 1, wherein at least one computer terminal is a mobile device, and the mobile device is configurable to connect to the computerized maintenance management system and send information to the computerized maintenance management system and receive information from the computerized maintenance management system.

16. A computer-network implemented method for managing maintenance of a plurality of resources such as equipment or devices, the method comprising:
  a. linking a plurality of computer terminals to a computer network, each computer terminal associated with an individual, and
  b. linking one or more of the computer terminals to one or more computers executing a computerized maintenance management system, implemented as a computer network service made available to users of a plurality of clients using the computer terminals;
  c. two or more of the plurality of clients permitting the computerized maintenance management system to (i) track maintenance activities of users associated with management of the plurality of resources across the two or more clients, (ii) extract data representing an equipment performance or trend of one or more of the plurality of resources from the maintenance activities, and (iii) enabling the users to upload information or documents related to resource management to the computer system, thereby extracting an information set;
  d. the computerized maintenance management system executing an analytics and suggestion routine, the analytics and suggestion routine analyzing the information set and generating automatically one or more suggestions representing at least one of: suggested maintenance actions, product and service requirements for clients; and
  e. at least one client receiving the suggestions at one or more computer terminals.

17. The method of claim 16, comprising filtering the suggestions for relevance to a participating client, and transferring to the participating client relevant suggestions.

18. The method of claim 16, comprising suggesting preventative maintenance actions.

19. The method of claim 16, comprising the computerized maintenance management system monitoring performance of a set of resources associated with varying maintenance actions from the plurality of resources, and extracting best practice information based on one or more resources that perform the best, and using these best practices to generate the suggestions.

20. The method of claim 16, comprising filtering confidential information, sensitive information, or information that a client elects not to share, from the suggestions.

* * * * *